(12) United States Patent
Ranke et al.

(10) Patent No.: US 8,457,116 B2
(45) Date of Patent: Jun. 4, 2013

(54) MOBILE TECHNOLOGY

(75) Inventors: Karl-Peter Ranke, Herzogenrath (DE);
Andreas Witzel, Herzogenrath (DE);
Michael Nils Olov Lindström, Tullinge (SE); Jan Erik Lindquist, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 715 days.

(21) Appl. No.: 12/594,382

(22) PCT Filed: Oct. 26, 2007

(86) PCT No.: PCT/EP2007/061572
§ 371 (c)(1),
(2), (4) Date: Oct. 2, 2009

(87) PCT Pub. No.: WO2008/119396
PCT Pub. Date: Oct. 9, 2008

(65) Prior Publication Data
US 2010/0118778 A1    May 13, 2010

Related U.S. Application Data

(60) Provisional application No. 60/909,545, filed on Apr. 2, 2007.

(30) Foreign Application Priority Data

Aug. 10, 2007  (GB) .................................. 0715555.9

(51) Int. Cl.
*H04L 12/66* (2006.01)
*H04M 7/00* (2006.01)
*H04L 29/06* (2006.01)

(52) U.S. Cl.
CPC ......... *H04M 7/006* (2013.01); *H04L 29/06027* (2013.01)
USPC ............ 370/353; 370/328; 370/352; 370/401

(58) Field of Classification Search
USPC .................. 370/328, 352, 353, 401; 709/227, 709/228, 230
See application file for complete search history.

(56) References Cited

U.S. PATENT DOCUMENTS 7,817,648 B2 *  10/2010  Rasanen ........................ 370/401
2007/0073891 A1 *  3/2007  Foltan et al. .................. 709/230
(Continued)

FOREIGN PATENT DOCUMENTS
DE        102005050586 B3 *  11/2006

OTHER PUBLICATIONS

"3GPP TR 29.863 V7.1.0 3rd Generation Partnership Project; Technical Specification Group Core Network and Terminals; Feasibility Study for the multimedia inter-working between the IP Multimedia Core Network (CN) Subsystem OMS) and Circuit Switched (CS) networks (Release 7)" Internet Article, [Online] Mar. 2007, pp. 1-58, XPOO2468033 Retrieved from the Internet: URL:http://www.3gpp.org/ftp/Specs/archive/29_series/29.863/29863-710.zip> [retrieved on Feb. 7, 2008] sections: 4.1, 7, 7.2, 7.2.1.1, 7.2.1.4, 7.2.2, 7.3, 7.3.1.1.1, 7.3.1.3, 7.3.3.1.

(Continued)

*Primary Examiner* — Derrick Ferris
*Assistant Examiner* — Scott M Sciacca

(57) ABSTRACT

Apparatus for enabling interworking of Circuit Switched video calls with video calls using IP multimedia protocols, comprising: a MGW; and a MGCF; wherein the apparatus is arranged to use MONA functionality to accelerate the set-up of video calls.

25 Claims, 24 Drawing Sheets

U.S. PATENT DOCUMENTS

| | | | |
|---|---|---|---|
| 2007/0195802 A1* | 8/2007 | Kallio et al. | 370/401 |
| 2007/0297352 A1* | 12/2007 | Jabri et al. | 370/261 |
| 2008/0037522 A1* | 2/2008 | Rasanen | 370/352 |
| 2008/0316998 A1* | 12/2008 | Procopio et al. | 370/352 |
| 2009/0290573 A1* | 11/2009 | Belling et al. | 370/352 |
| 2010/0157851 A1* | 6/2010 | Farah | 370/260 |

OTHER PUBLICATIONS

Dilithium Networks, Inc. and Packetvideo, Inc.: "H.324 Annex K (MONA) draft modifications related to industry-raised issues" ITU-T Study Group 16—Contribution 114, Nov. 2006, pp. 1-29, XP002468034 sections: K2, K.6.2, K.7.1, K.7.1.2, K7.2.1, K.7.2.2.1.

"3GPP TR 29.863 V8.O.D 3rd Generation Partnership Project; Technical Specification Group Core Network and Terminals; Feasibility Study for the multimedia inter-working between the IP Multimedia Core Network (CN) Subsystems (IMS) and Circuit Switched (CS) networks (Release 8)" Internet Article, [Online] Sep. 2007, pp. 1-67, XP002468035 Retrieved from the Internet: URL:http://www.3gpp.org/ftp/Specs/archive/29_series/29.863/29863-800.zip> [retrieved on Feb. 7, 2008] sections: 4.1, 7, 7.2, 7.2.1.1, 7.2.1.4, 7.2.2, 7.3, 7.3.1.1.1, 7.3.1.3, 7.3.3.1, 7.4.1-7.4.5.

* cited by examiner

MOBILE TECHNOLOGY

This application claims the benefit of U.S. Provisional Application No. 60/909,545, filed Apr. 2, 2007, the disclosure of which is fully incorporated herein by reference.

TECHNICAL FIELD

The present invention relates to improvements in mobile telecommunication. The invention relates in particular to the way in which CS (circuit switched) video calls are interworked efficiently towards video calls in IMS (IP Multimedia Subsystem) or towards video calls using other IP multimedia protocols.

BACKGROUND

Various abbreviations are used in the present specification. These are listed and explained towards the end of the description.

Mobile networks are currently evolving from pure circuit switched networks towards IP based networks, and by that integrate into IP based infrastructure that is also used for the internet, the World Wide Web and the datacom industry.

Mobile operators that install IMS networks and offer IMS services want to interwork calls between the CS domain and the IMS domain. This is specified in 3GPP for speech, and the responsible node for controlling this interworking is called MGCF. Additionally, interworking with other IP multimedia protocols such as RTSP and H.323 may be implemented in such MGCF.

On top of speech, the CS domain also supports CS video calls by applying the 3G-324M specification. Within the CS core network, a CS video call is a pure CS UDI data call. The control of the video is done using H.245 inband protocol directly between the terminals.

The audio, video, and control channel are multiplexed in order to fit into the single 64 kbps UDI CS data bearer.

FIG. 1 illustrates various nodes involved in a CS video call between two CS terminals 1, using H.245 protocol.

Referring to FIG. 1, each CS terminal 1 is connected to a corresponding M-MGw 2 via a RAN 3. Each M-MGw 2 is controlled by a MSC-S 4. Since the video control protocol H.245 (according to ITU) is used inband, a prerequisite for starting H.245 control signaling is that the UDI bearer is fully established. So the actual video setup starts after the establishment of the CS bearer. Furthermore, the H.245 protocol is rather complex and requires a number of back-and-forth signaling. The result of this is that the call setup time of CS video calls is rather long.

This has been recognized as a problem and recently the concept of MONA (Media Oriented Negotiation Acceleration) has been added to the specifications of CS video calls (ITU-T Recommendation H.324, new Annex K). The main purpose of MONA is to accelerate the setup of CS video calls.

MONA is composed of three protocols and three classes. The protocols are SPC, MPC and ACP. It has been specified that a Class I type terminal shall support SPC, MPC and ACP, that a Class II type terminal shall support MPC and ACP and that a Class III type terminal shall support SPC and ACP.

The initial exchange of preferences between MONA supporting terminals is performed using a PM (Preference Message), which contains signalling information in order to perform MONA procedures. Each terminal will send Preference messages when a call using MONA is initiated.

MPC (Media Preconfigured Channel) is used to quickly setup the multimedia session using any of the preconfigured channels. MPC support, and the setup of the preconfigured channels, is done as part of the PM procedure (using the MPC-TX and MPC-RX bits).

ACP (Accelerated Call Procedure) is available as fallback, in case one of the parties does not support MPC, or it can be used in addition to MPC/SPC in order to add/remove/modify channels, or in case not all channels can be established successfully with MPC. ACP can be viewed as an "optimized H.245 signalling protocol". It uses H.245 message formats for signalling.

In SPC (Signaling Preconfigured Channel) the predefined SPC channel is used to negotiate the preconfigured audio and video channels to be used for the call. The SPC procedure is used if supported by both terminals and if at least one of the MONA terminals prefers to use SPC, or if the indicated preconfigured channels of both ends do not match.

SPC channel negotiation is done using MOS (Media Oriented Setup) request messages.

In summary, the following problems are associated with pure H.245 processing:
- 3G-324M requires inband H.245 end-to-end signaling after bearer establishment for negotiation of capability and configuration of codecs and multiplex.
- 3G-324M requires negotiation of H.223 multiplex level before any H.245 negotiation can take place
- Typical 3G-324M roundtrip is at least 250 ms+terminal processing time
- Typically 10-12 H.245 messages are needed before media can be exchanged, some can be grouped, but requiring at least 3-4 roundtrips MONA addresses the above problems.

FIG. 2 (which is similar to FIG. 1) illustrates various nodes involved in a CS video call between two CS terminals, using MONA, and FIG. 3 shows how MONA is integrated into the 3GPP video framework of TS 26.111.

There is currently in 3GPP a technical feasibility study ongoing on how to provide CS-IMS interworking for video calls. The current scope of this feasibility study sketches how to do the video interworking if the H.245 procedures are used for video control. The principles of this are shown in FIG. 4. As shown in FIG. 4, a CS terminal 1 is connected via a RAN to a M-MGw 2, which is controlled by a MSC-S 4. The MSC-S 4 and the M-MGw 2 are connected to a SIP client 6 across a NNI 7, whereby the connection from the MSC-S 4 to the SIP client 6 is via an IMS 5.

SUMMARY

The present inventors have appreciated that a problem with the existing solution of CS-IMS video interworking is that it relies fully on the H.245 procedures for video setup and that it does not support any MONA procedures for accelerated setup.

The present inventors have created a technique for efficiently utilizing MONA to accelerate video setup at interworking with IMS.

Accordingly, in one aspect the present invention provides an apparatus for enabling interworking of CS (Circuit Switched) video calls with video calls using IP multimedia protocols, comprising a MGW and a MGCF, wherein the apparatus is arranged to use MONA functionality to accelerate the set-up of video calls.

In another aspect the present invention provides a method of interworking CS (Circuit Switched) video calls with video calls using IP multimedia protocols, comprising providing a MGW and a MGCF, and accelerating the set-up of video calls using MONA functionality.

BRIEF DESCRIPTION OF THE DRAWINGS

Some preferred embodiments of the invention will now be described by way of example only and with reference to the accompanying drawings, in which.

DETAILED DESCRIPTION

Figure 1:
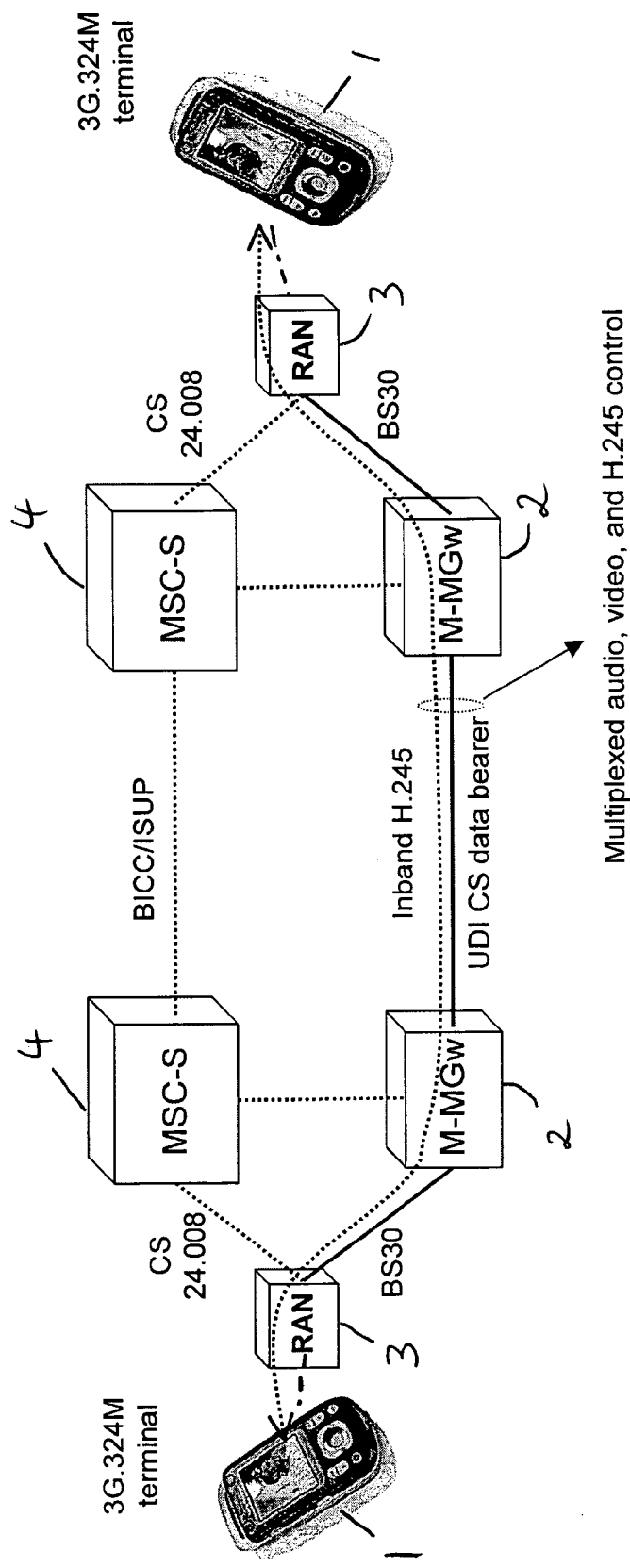
FIG. 1 illustrates various nodes involved in a CS video call between two CS terminals, using H.245.
Figure 2:
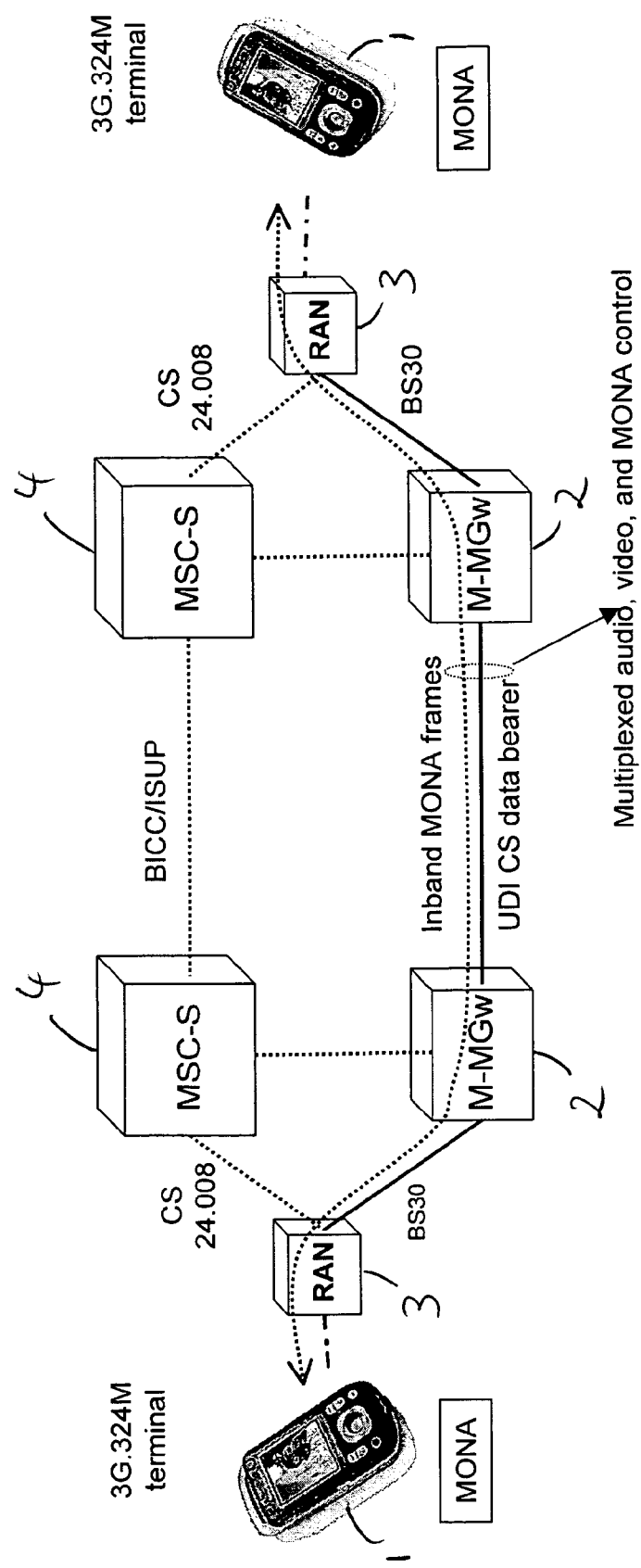
FIG. 2 illustrates various nodes involved in a CS video call between two CS terminals, using MONA.
Figure 3:
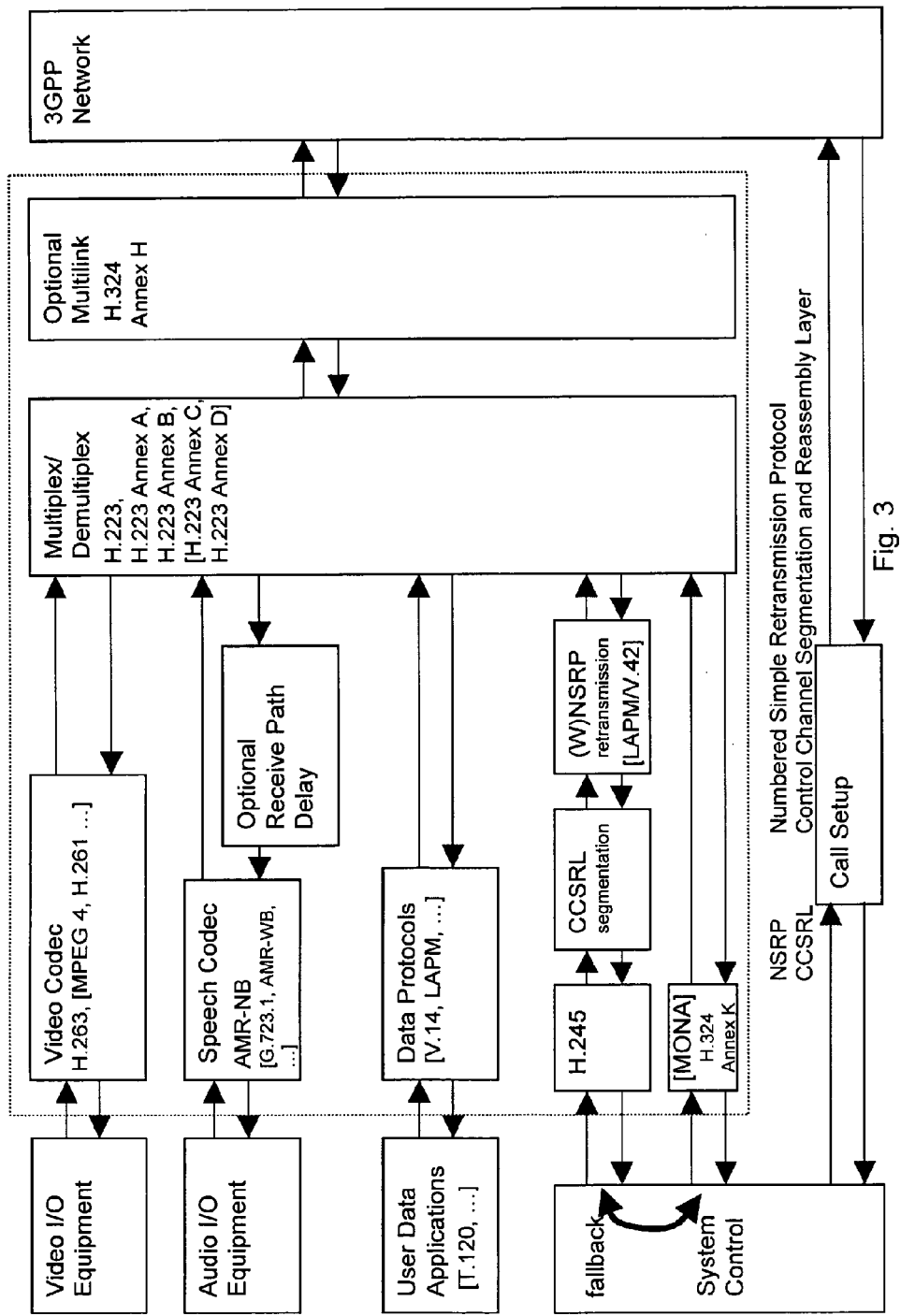
FIG. 3 shows how MONA is integrated into the 3GPP video framework of TS 26.111.
Figure 4:
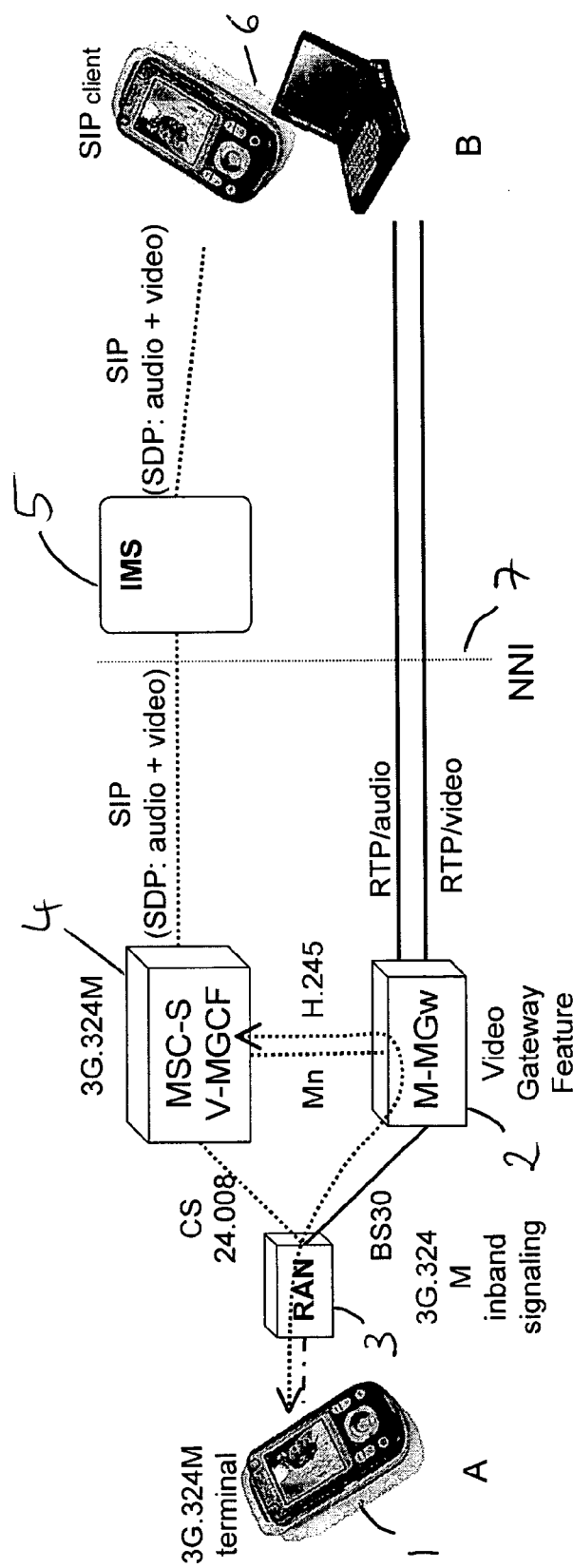
FIG. 4 shows the principles of CS-IMS Interworking for Video, using H.245.
Figure 5:
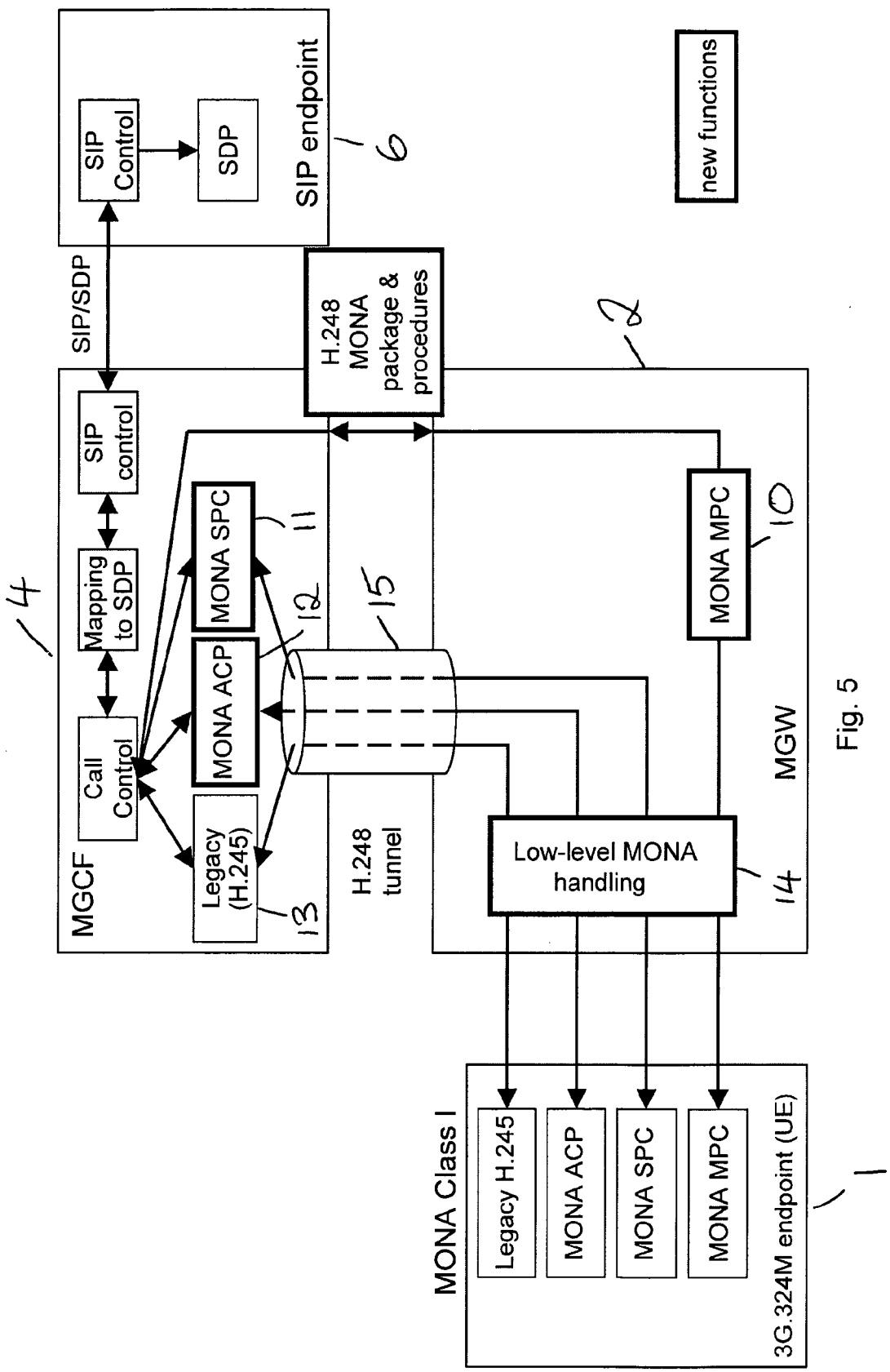
FIG. 5 illustrates the signalling architecture of MONA at CS-IMS Video Interworking according to a first embodiment of the invention.

FIG. 5 shows how MONA protocols are integrated into the CS-IMS video interworking architecture according to the first embodiment. As shown in FIG. 5, the first embodiment has MPC 10 terminated in the MGW 2, while SPC 11 and ACP 12 protocols are terminated in MGCF 4.

According to the first embodiment, it is assumed that the remote 3G-324M endpoint (i.e. usually the UE) 1 supports all MONA protocols, i.e. is a class 1 MONA implementation. So it supports the MPC, SPC, and ACP MONA protocols. In reality, terminals may support only subsets, i.e. may be a class 2 or class 3 terminal, or a terminal might not support MONA protocol at all.

The legacy H.245 signaling 13 is terminated in the MGCF 4. So all H.245 messages decoded by the low level handler 14 are forwarded unmodified to the MGCF 4. This forwarding via H.248 is done by a H.248 tunnelling package 15.

The MGCF handles the SIP interface towards IMS. For this purpose it handles the SIP protocol and the related SDP description of the media. In this scenario the SDP describes the video and audio characteristics. So the SDP is generated from the information received from the remote 3G-324M endpoint.

The advantages of terminating SPC and ACP in the MGCF, according to the first embodiment, are that this structure has similarities with legacy H.245, and that it keeps complexity in the MGCF rather than in the MGW.

On the other hand, MPC is a very low level protocol, and so it is preferred that it be placed in the MGW.

Figure 6:
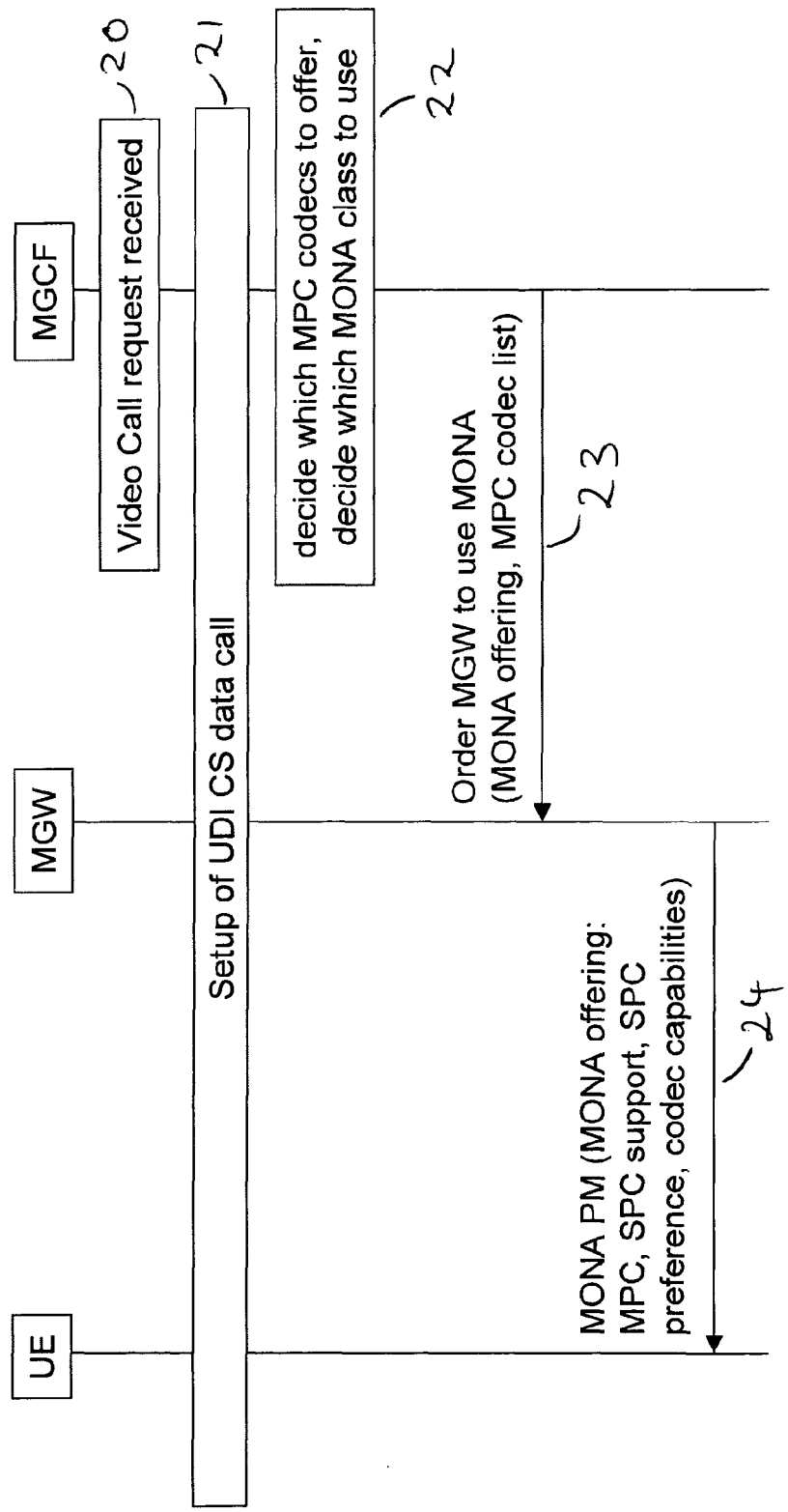
FIG. 6 illustrates steps ("MONA Offer") used in the first embodiment.

When a Video Call Request is received, the interworking of video calls works as follows:

Initially the MONA offer is prepared. As shown in FIG. 6, the MGCF receives a request (20) for interworking of a video call. This request may be received in the MGCF from either a CS terminal or from a SIP terminal, i.e. representing the case of CS=>IMS or IMS=>CS interworking.

The normal call setup for a CS UDI data call is then performed (21) in order to set up the CS bearer for the video call.

Then the MGCF decides which codecs to use for the call (22). This decision can depend on preconfigured operator preferences, and, if available, the information received in the received video call request (received from either the CS or IMS side). Furthermore, the MGCF decides which MONA class shall be used for the call and which MONA procedures are preferred. This decision can depend on preconfigured operator preferences.

Then the MGCF indicates (23) to the MGW to start MONA procedures towards the UE, the MONA class and the preferred MONA procedure to be offered in the MONA protocol negotiation, and also the codecs to be used in MPC, if class 1 or 2 is indicated.

The MGW interfaces the remote MONA compliant UE via a low-level MONA handling function. This function handles the MONA frames, and the H.223 multiplexing.

The MGW then sends (24) a MONA preference message to the remote UE containing the MONA offer and the codecs (in case of class 1 or 2) as received from the MGCF. The MGW may also send the SPC message (in case of class 1 or 3) to the remote UE, as received from the MGCF.

It is possible that a fallback from MONA to legacy H.245 signaling is to be performed. According to specifications, the fallback from MONA to legacy H.245 signaling is to be performed upon reception of either: more than 20 legacy stuffing flags, or a normal H.245 TCS message. In the first embodiment H.245 fallback handling is performed by the low-level MONA handling function within the MGW.

Figure 7:
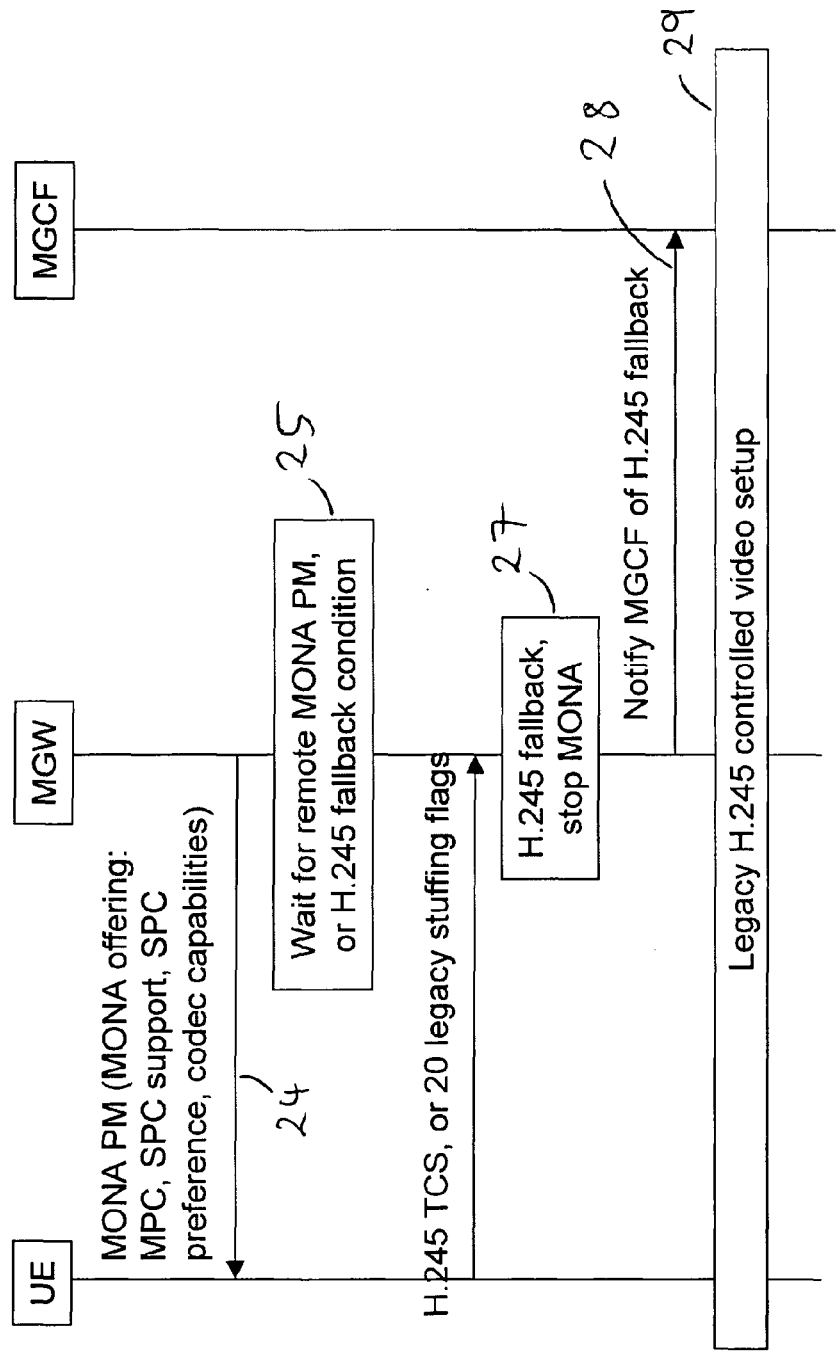
FIG. 7 illustrates the handling of a fallback to legacy H.245 procedures according to the first embodiment.

As shown in FIG. 7, after sending the MONA offer in the preference message (24), the MGW waits (25) for signals from the UE. If the low-level MONA handling function in MGW detects (26) any of the above H.245 fallback conditions, MONA handling is to be terminated (27) and the MGW informs (28) the MGCF about the fallback to H.245 condition. The MGCF may also detect the H.245 fallback condition by itself, for example if it receives a H.245 TCS message prior to the notification by the MGW (this is not shown in FIG. 7). In either of these cases the MGCF then initiates (29) normal video setup using legacy H.245.

Figure 8:
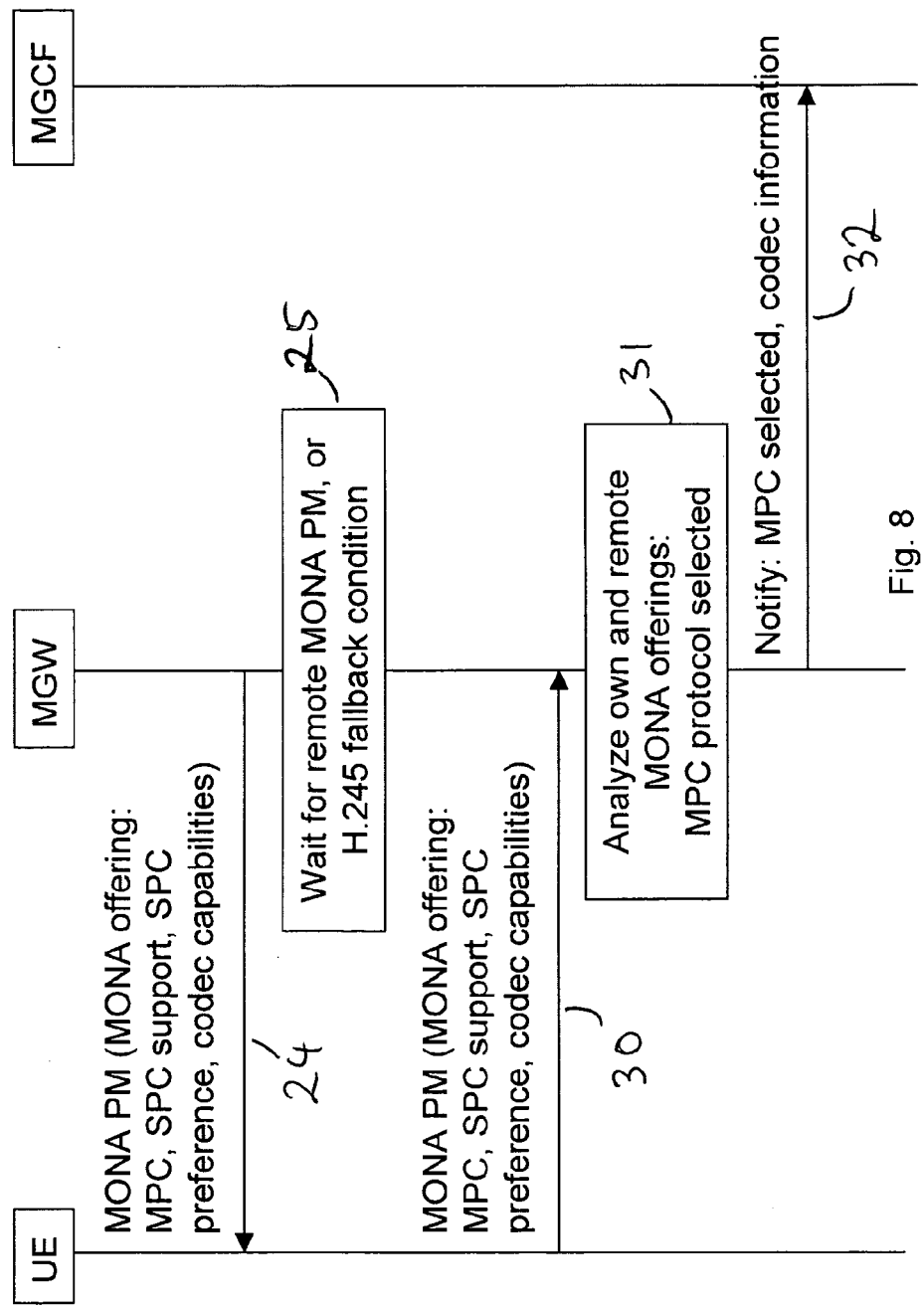
FIG. 8 illustrates steps performed during selection of MPC Protocol according to the first embodiment.

Referring to FIG. 8, we will now consider the case when MPC Protocol is to be selected. After sending the MONA offer (24) in the preference message (as described above), the MGW waits (25) for signals from the UE. In this case a MONA preference message is received (30) from the UE. This message contains the MONA offer of the UE, containing preferences as to which MONA protocol to use. If MPC protocol is preferred by the UE then a list of codecs supported by the UE is included in the PM received from the UE, and media may be received from the UE as well. This reply from the UE is analyzed (31) by the MGW and here the MPC protocol is selected. This result is notified (32) to the MGCF together with the codec information and the information about opened preconfigured channels due to received media.

Figure 9:
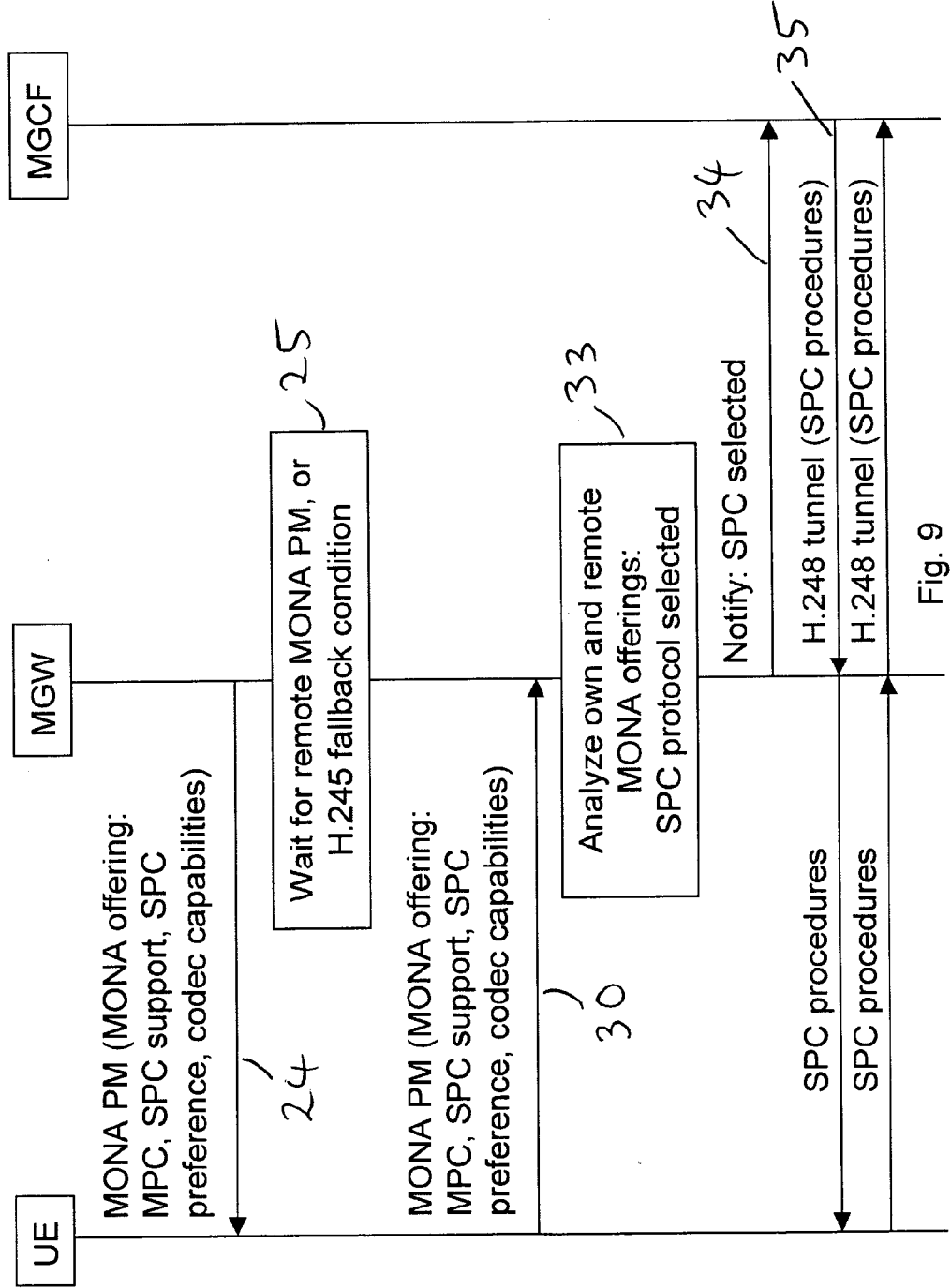
FIG. 9 illustrates steps performed during selection of SPC Protocol according to the first embodiment.

Referring to FIG. 9, we will now consider the case when SPC Protocol is to be selected. After sending the MONA offer (24) in the preference message (as described above), the MGW waits (25) for signals from the UE. In this case a MONA preference message is received (30) from the UE. This message contains the MONA offer of the UE, containing preferences as to which MONA protocol to use and which codecs are supported by the UE.

According to specifications, SPC is to be selected if at least one of the MONA terminals prefers to use SPC, or if the indicated MPC codecs do not match.

The reply from the UE is analyzed (33) by the MGW and here the SPC protocol is selected. This result is notified (34) to the MGCF. The MGCF then uses SPC procedures (35) towards the remote 3G-324M endpoint for video setup.

Figure 10:
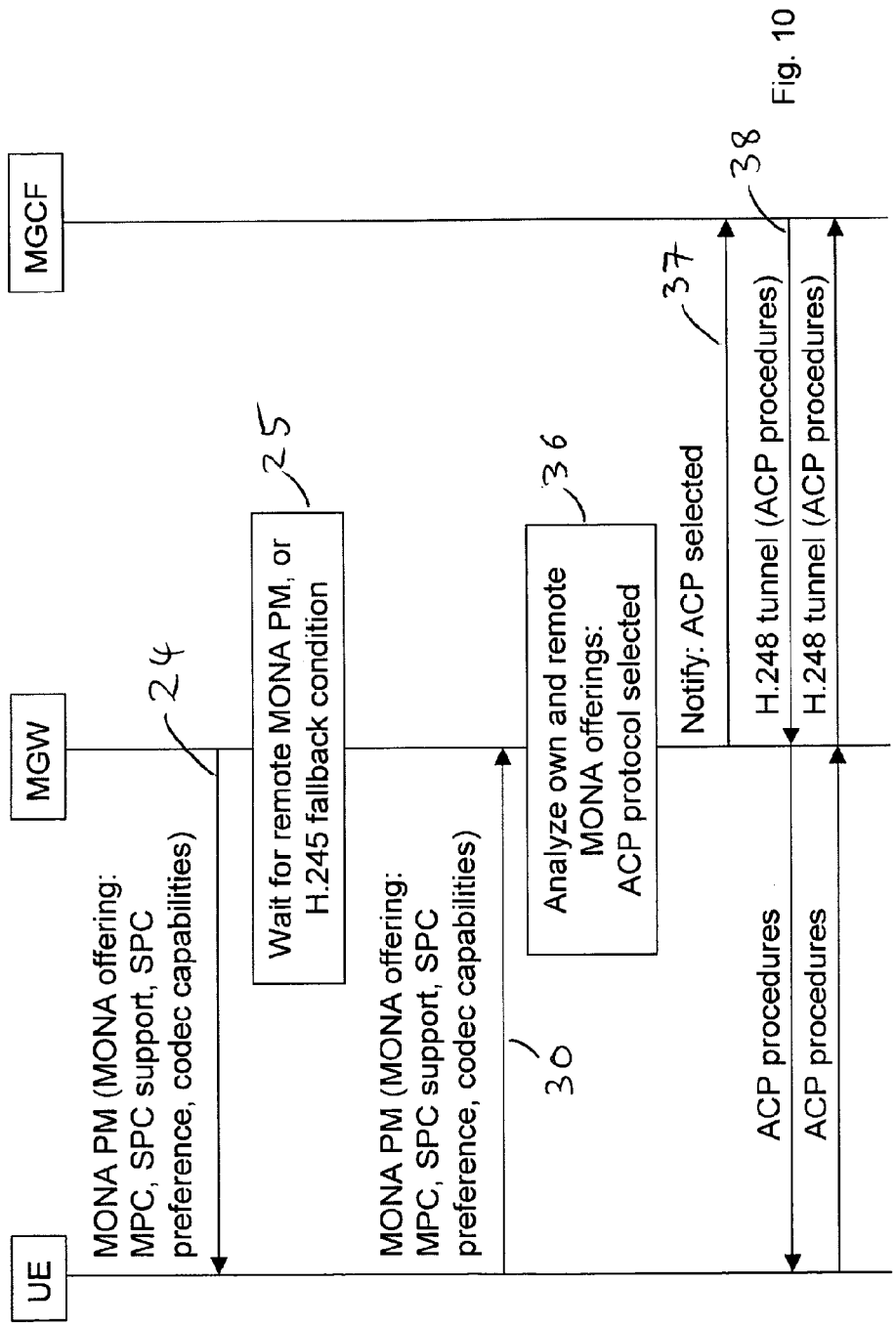
FIG. 10 illustrates steps performed during selection of ACP Protocol according to the first embodiment.

Referring to FIG. 10, we will now consider the case when ACP Protocol is to be selected. Whilst this case is being described in the context of a fallback from SPC to ACP (or a selection of ACP instead of SPC), it will be understood that similar principles would apply to a fallback from MPC to ACP (or a selection of ACP instead of MPC).

After sending the MONA offer (24) in the preference message, the MGW waits (25) for signals from the UE. In this case a MONA preference message is received (30) from the remote UE. This message contains the MONA offer of the UE, containing preferences as to which MONA protocol to use and which codecs are supported by the UE.

According to specifications, ACP is to be selected if SPC is not supported by the remote 3G-324M endpoint, or if SPC is not preferred by either side.

The reply from the UE is analyzed (36) by the MGW and here the ACP protocol is selected. This result is notified (37) to the MGCF. The MGCF then initiates ACP procedures (38) towards the remote 3G-324M endpoint for video setup.

Figure 11:
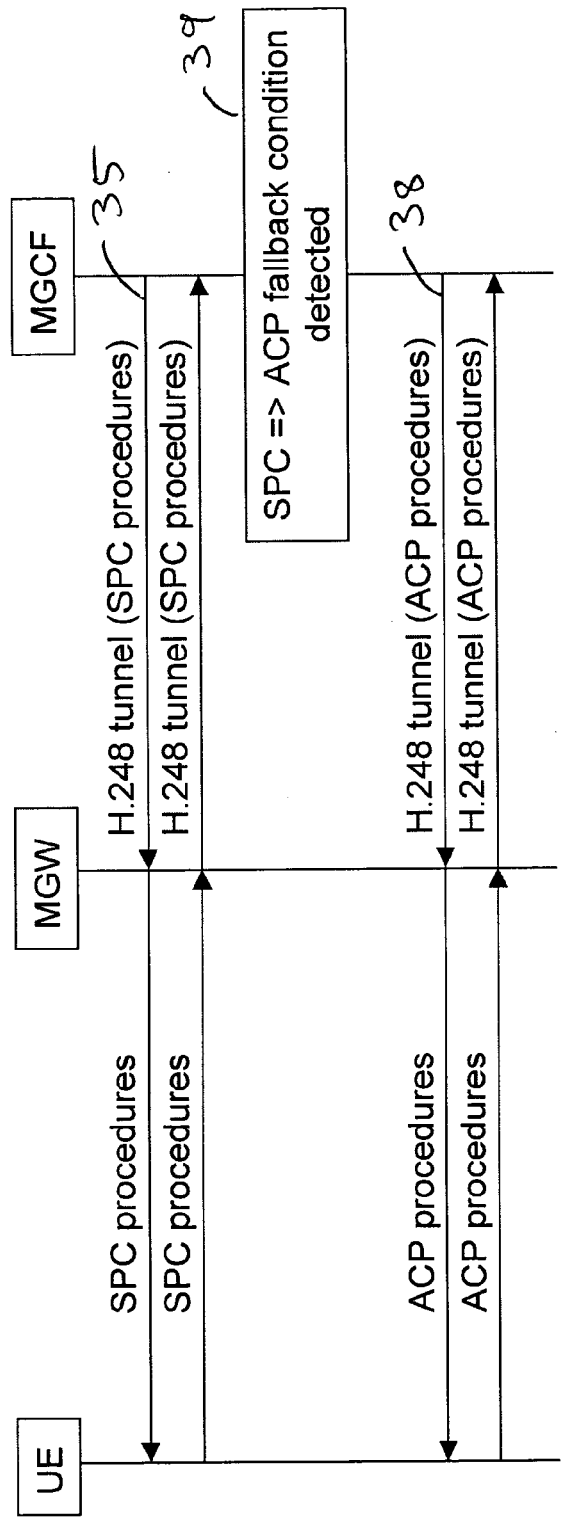
FIG. 11 illustrates steps performed during a fallback from SPC to ACP according to the first embodiment.

As illustrated in FIG. 11, fallback from SPC (35) to ACP (38) may also occur after the MONA protocol negotiation has decided to use SPC protocol.

According to specifications, ACP fallback (39) is to be triggered if any of the following is detected:

A normal H.245 TerminalCapabilitySet message with empty genericControlCapability containing MOS OID after completion of the MOS procedure (in this embodiment the MGW has to scan the H.245 messages for TCS) or A terminal does not detect a valid MOS request, or does not accept the ICM, within a multiple of the network round trip delay (RTD) period, for example within 3 RTDs.

Since in the first embodiment SPC and ACP are both located in the MGCF, this fallback is handled internally in the MGCF.

Figure 12:
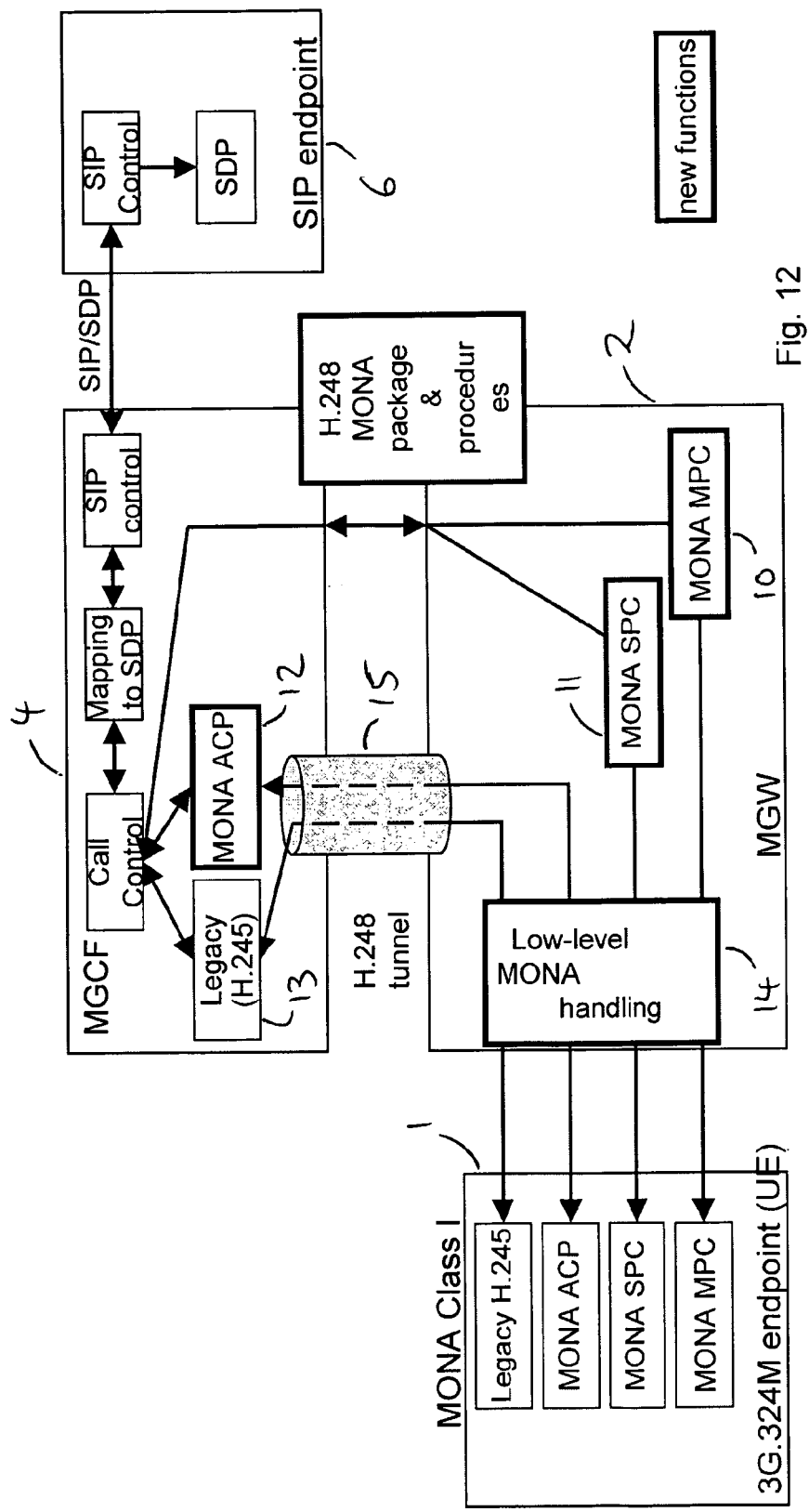
FIG. 12 illustrates the signalling architecture of MONA at CS-IMS Video Interworking according to a second embodiment of the invention.

FIG. 12 shows how MONA protocols are integrated into the CS-IMS video interworking architecture according to the second embodiment. As shown in FIG. 12, the second embodiment has MPC and SPC terminated in the MGW, while ACP protocol is included in MGCF.

Most procedures as described in connection with the first embodiment are also applicable for the second embodiment. An exception is the handling of the SPC protocol selection.

Figure 13:
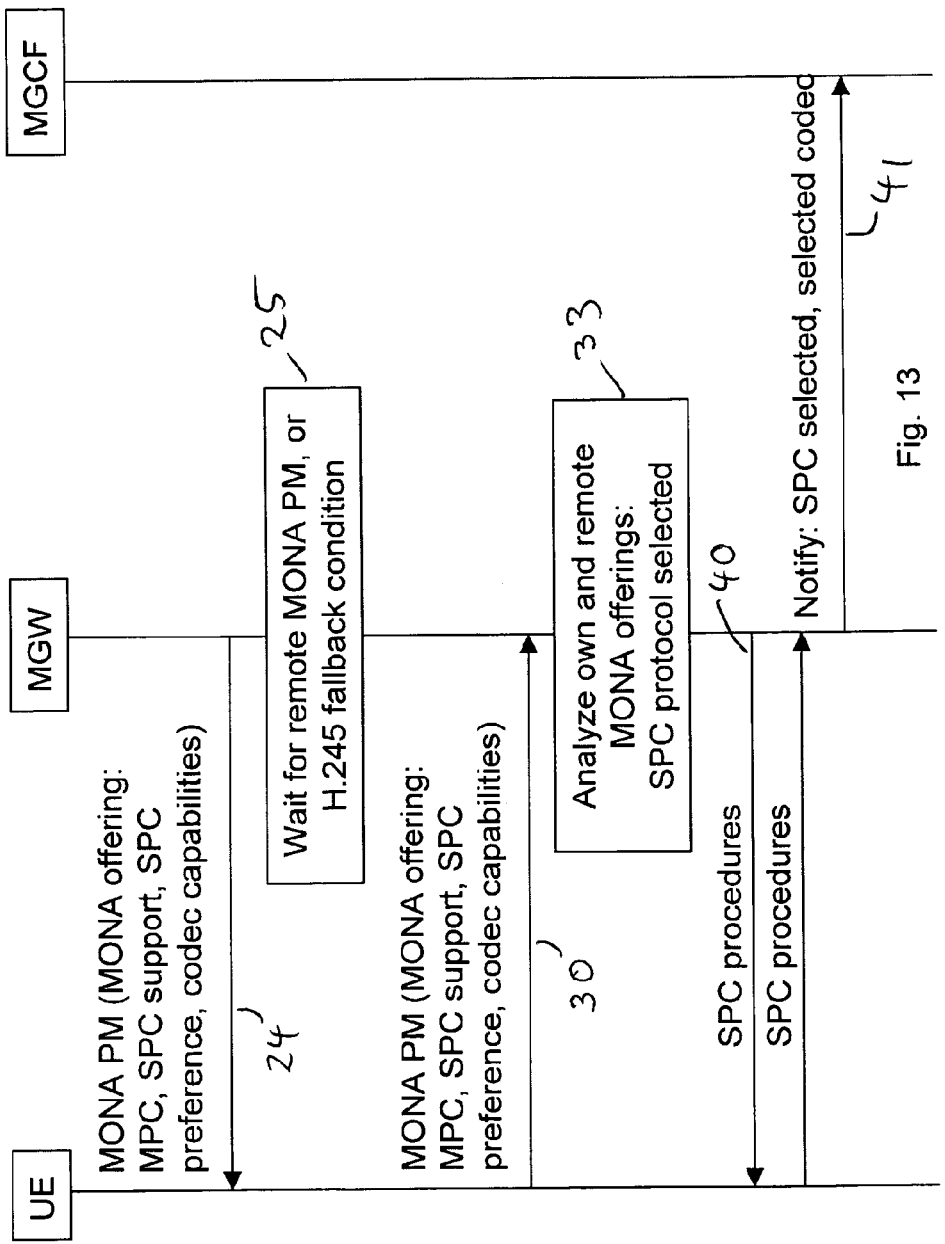
FIG. 13 illustrates steps performed during selection of SPC Protocol according to the second embodiment.

Referring to FIG. 13, we will now consider the case when SPC Protocol is to be selected in the second embodiment. After sending the MONA offer (24) in the PM (preference message), the MGW waits (25) for signals from the UE. In this case a MONA preference message is received (30) from the remote UE. This message contains the MONA offer of the UE, containing preferences as to which MONA protocol to use and which codecs are supported by the UE.

According to specifications, SPC is to be selected if at least one of the MONA terminals prefers to use SPC, or if the indicated MPC codecs do not match.

The reply from the UE is analyzed (33) by the MGW and here the SPC protocol is selected. The MGW then initiates SPC procedures (40) towards the remote 3G-324M endpoint for video setup. The finally selected codec and the information that SPC protocol has been selected is notified (41) to the MGCF. If the remote 3G-324M endpoint does not support SPC, then the MGW would notify the MGCF that there is a fallback to ACP procedures.

Figure 14:
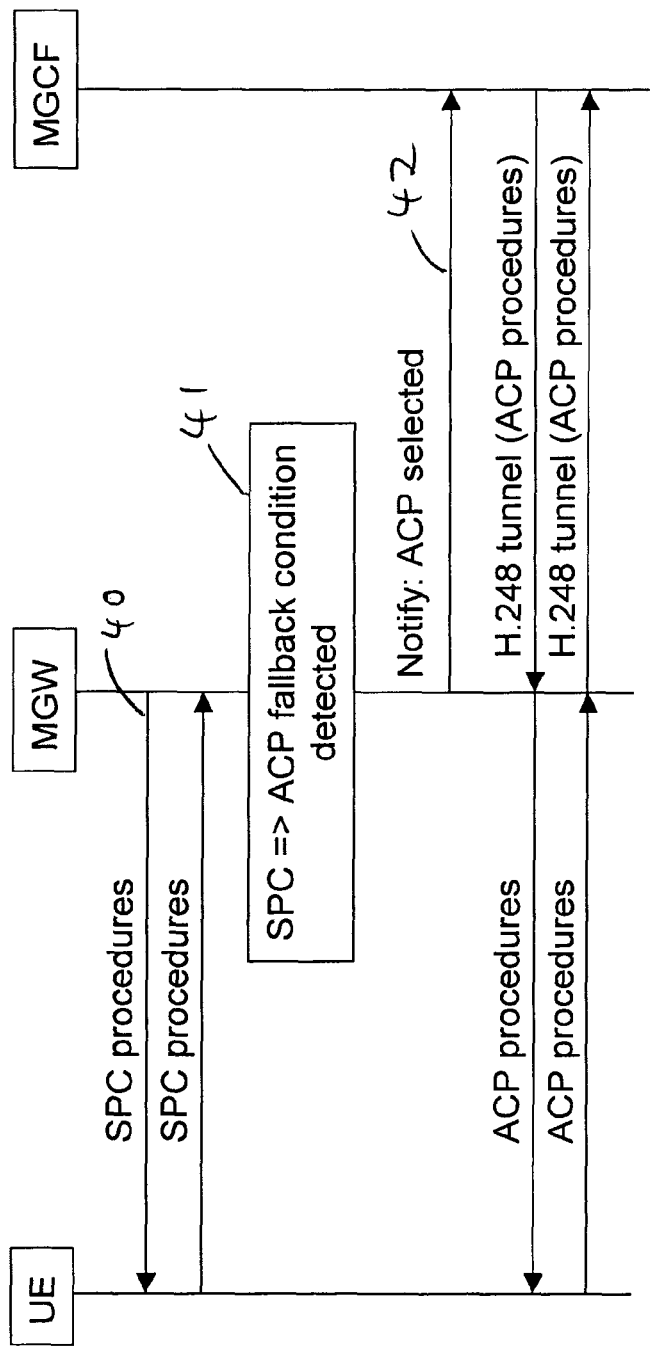
FIG. 14 illustrates steps performed during a fallback from SPC to ACP according to the second embodiment.

As illustrated in FIG. 14, fallback from SPC (40) to ACP (42) may also occur after the MONA protocol negotiation has decided to use SPC protocol.

According to specifications, ACP fallback (41) after protocol negotiation is to be triggered if any of the following is detected:

A normal H.245 TerminalCapabilitySet message with empty genericControlCapability containing MOS OID after completion of the MOS procedure, also detected in MGW, or A terminal does not detect a valid MOS request, or does not accept the ICM, within a multiple of the network round trip delay (RTD) period, for example 3 RTDs.

The signaling from the remote UE is analyzed by the MGW and the fallback condition is detected. This result is notified to the MGCF. The MGCF then initiates ACP procedures towards the remote UE.

Figure 15:
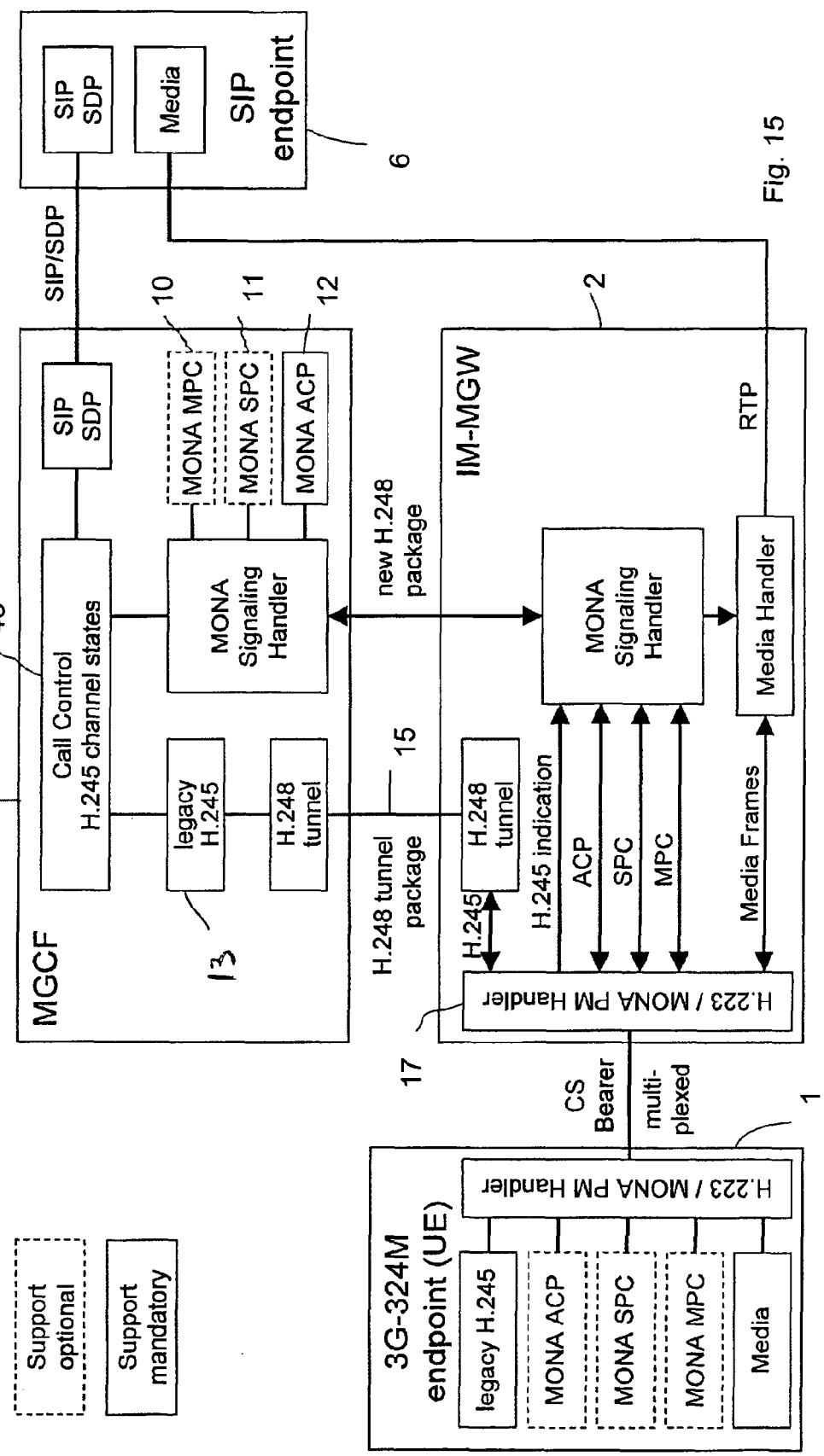
FIG. 15 illustrates the signalling architecture of MONA at CS-IMS Video Interworking according to a third embodiment of the invention.

FIG. 15 shows how MONA protocols are integrated into the CS-IMS video interworking architecture according to the third embodiment. As shown in FIG. 15, the third embodiment has all MONA protocols included in the MGCF. Centralizing all MONA protocols in the MGCF keeps full control in the MGCF.

For the purpose of FIG. 15 it has been assumed that the remote 3G-324M endpoint 1 (i.e. usually the UE) can support any MONA class (although it is possible that it may not support MONA procedures at all). ACP can be regarded as mandatory (if MONA is supported), as ACP is included in all three MONA classes.

The legacy H.245 signaling 13 is terminated in the MGCF 4. Since both ACP 12 and SPC 11 are H.245 based protocols these functional entities are located in parallel with the existing legacy H.245 protocol 13 within the MGCF 4. All H.245 based control signaling messages (i.e. H.245 legacy, ACP and SPC) are forwarded to/from the MGCF unmodified by the MGW 2. This forwarding via H.248 is done by a H.248 tunneling package 15.

The MONA MPC function 10 is located in the MGCF and it may include provisioned rules about what MPC codecs to offer in the transmit and receive direction during MPC negotiation. SDP information of the SIP client may be used as basis for this decision. The MONA MPC function provides MPC negotiation information to the MONA PM function of the MGW.

The MONA SPC function 11 is located in the MGCF and includes SPC negotiation functionality for handling SPC MOS requests and acknowledges. It may also include provisioned rules about what codecs and capabilities to offer and accept during MOS negotiation. SDP information of the SIP client may be used as basis for this decision. The MONA SPC function provides low-level SPC negotiation information to the MONA PM function of the MGW.

The ACP function 12 is located in the MGCF and includes negotiation functionality for ACP negotiation.

The call control function 43 of the MGCF is the main functional entity for interworking of CS and IMS call/session control signals.

The MONA PM (Preference Message) function is located in the MGW and is closely co-operating with the H.223 functionality. Both the MONA PM function (or MONA PM Handler) and the H.223 functionality are therefore shown in FIG. 15 as a combined function 17. The function 17 handles MONA low-level negotiation using information received from the MGCF. The information specified by the MGCF includes required information to be used in the Preference Messages sent but possibly also codec preferences, H.223 channel information and capabilities related to MONA. The function 17 will also assist in fallback decisions by identifying if a requested negotiation mechanism failed, but also in some situations if it succeeded.

The legacy H.245 signaling 13 is terminated in the MGCF 4. So all H.245 messages decoded by the low level handler are forwarded unmodified to the MGCF. This forwarding via H.248 is done by a H.248 tunnelling package 15.

The MGCF handles the SIP interface towards IMS. For this purpose it has to handle the SIP protocol and the related SDP description of the media. In this scenario the SDP describes the video and audio characteristics. So the SDP has to be generated from the information received from the remote 3G-324M endpoint 1.

The fourth embodiment is closely based on the third embodiment and can be regarded as a refinement thereof. The above description of the third embodiment also applies to the fourth embodiment. Likewise, much of the description of the fourth embodiment below also applies to the third embodiment. A difference between the third embodiment and the fourth embodiment is the fact that in the fourth embodiment some signaling mechanisms are initiated in parallel, which is not the case in the third embodiment.

The fourth embodiment is based on the Inventors' appreciation that the MGCF, which should support all possible implementation options (legacy H.245, MONA class I, II or III) in order to enable optimal interworking with all possible 3G-324M endpoint implementations, will have to take a decision per video call whether the call setup should be attempted with legacy H.245 signalling or with MONA MPC or with MONA SPC procedures or potentially with MONA ACP procedures. The problem with MONA procedures is that video call setup may be delayed in case MGCF and 3G-324M endpoint have to fallback from one MONA procedure to another MONA procedure or to legacy H.245 signalling. One contribution to such a delay would be the additional information exchange between MGCF and MGW that is needed to perform the fallback procedure.

Figure 22:
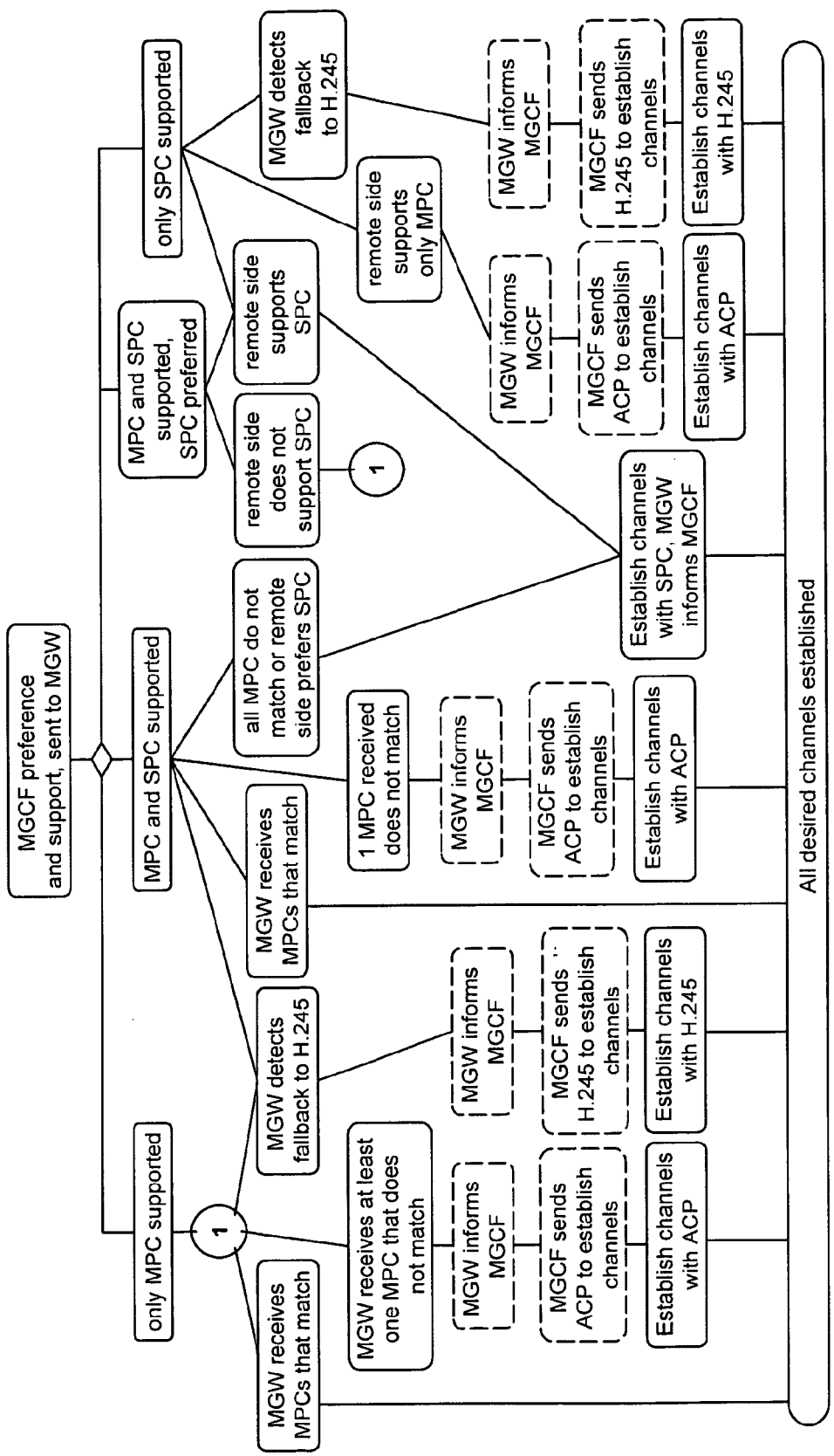
FIG. 22 shows possible ways to setup a video call from MGCF/MGW towards a remote 3G-324M endpoint.

FIG. 22 provides an overview over possible ways to setup a video call from MGCF/MGW towards a remote 3G-324M endpoint, depending on the MGCF preferences and the endpoint capabilities/preferences to support certain MONA procedures. The trivial case that MONA is not attempted at all and legacy H.245 is used directly is not shown in the FIG. 22. The boxes drawn with dashed lines show procedures which the parallel procedures according to the fourth embodiment aim to optimize.

Figure 23:
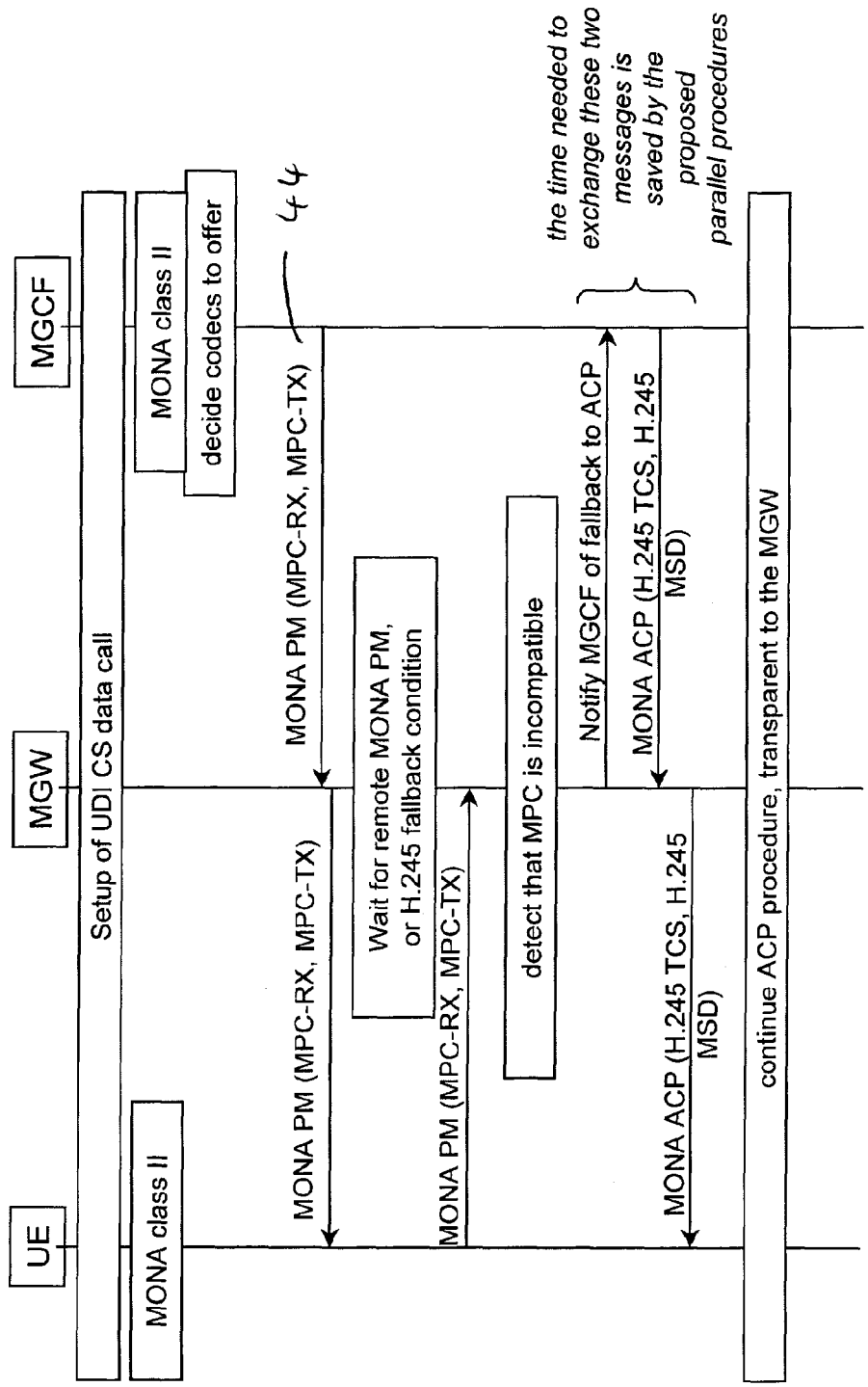
FIG. 23 shows an example message flow for the fallback from MPC to ACP according to the third embodiment.

An example for the message exchange between MGCF and MGW according to the third embodiment that may be optimized with the proposed parallel procedures according to the fourth embodiment is shown in FIG. 23.

The call control function of the MGCF decides (44), based on provisioned rules, what signaling mechanisms shall be initiated in parallel towards the CS side in order to handle all types of UE's on the CS side (i.e. legacy, MONA class I, class II or class III types of terminals). Initiating several signaling mechanisms in parallel will reduce call setup time independent of UE terminal type.

The MONA PM handling function of the MGW will also support the handling of parallel initiation of different signaling mechanisms. As an example if both SPC, MPC, ACP and legacy H.245 signaling is received from MGCF, the function will ensure that these mechanisms are handled accordingly without conflict by for example temporary buffer ACP and legacy H.245 signaling until MONA negotiation has failed. An indication about whether a specific signaling message sent by the MGCF is allowed to be buffered is given by the MGCF. The MONA PM function will also be able to parse received signaling messages from the UE in order to quickly detect a fallback condition. A temporary buffered signaling message from the MGCF will then either be sent to the UE or deleted depending on the outcome of the negotiation.

Figure 16:
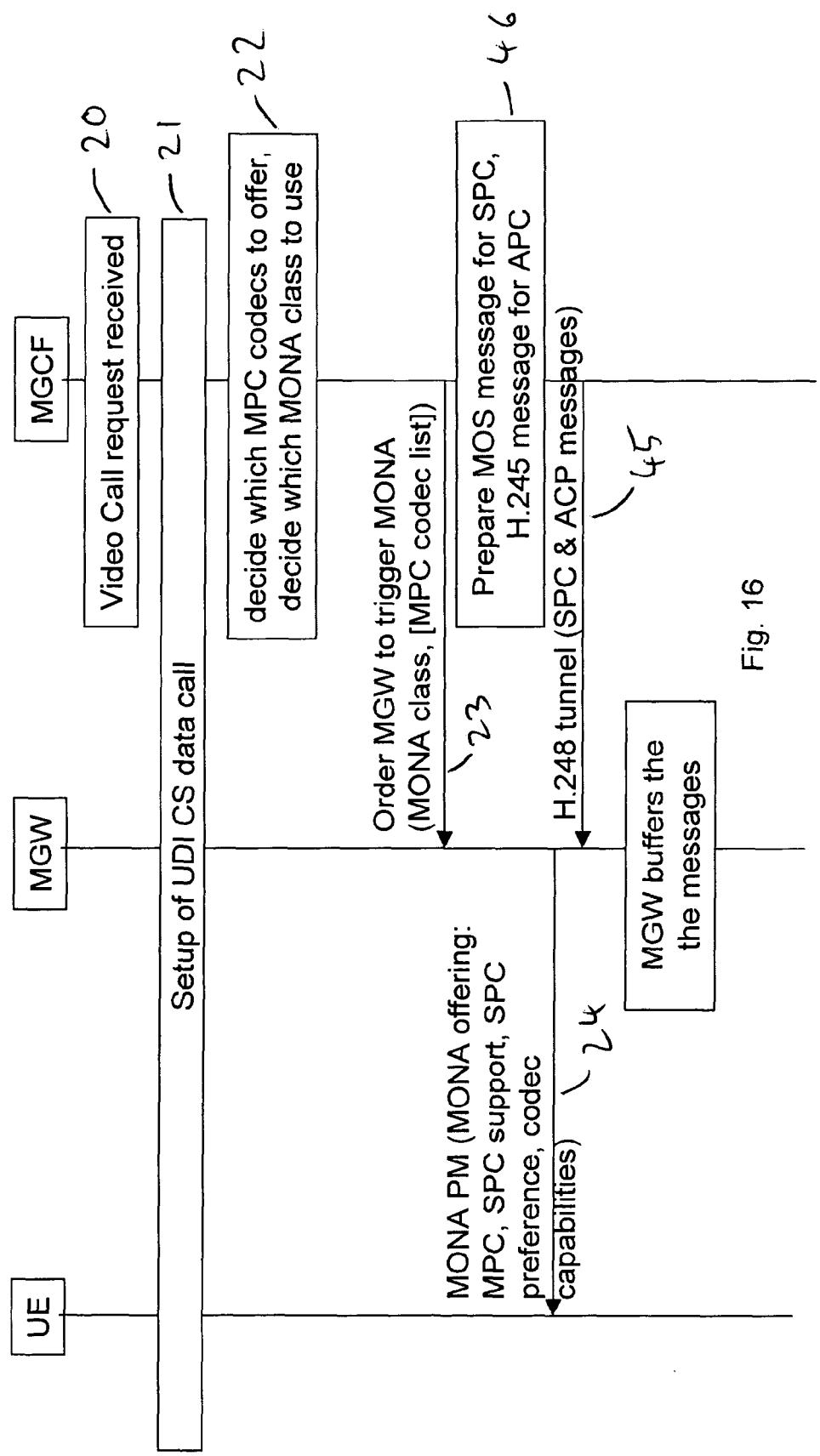
FIG. 16 illustrates steps ("MONA Offer") used in the third embodiment.

As shown in FIG. 16, when the MGCF receives a video call request (20) with IMS interworking (which may be received either from a CS terminal or from a SIP terminal) it prepares the MONA offer. For the purpose of FIG. 16 it has been assumed that the CS 3G-324M endpoint is located in a mobile terminal (here denoted UE).

Then the normal call setup for CS UDI data call is performed (21) in order to set up a UDI CS bearer for the video call.

Then the MGCF decides which codecs to use for the call (22). This decision can depend on preconfigured operator preferences, and, if available, the information received in the received video call request. Furthermore, the MGCF decides which MONA class shall be used for the call and which MONA procedure shall be preferred. This decision can depend on preconfigured operator preferences.

Then the MGCF orders (23) the MGW to trigger MONA procedures towards the UE, the MONA class and the preferred MONA procedure to be offered in the MONA protocol negotiation, and also the codecs to be used in MPC, if class 1 or 2 is indicated.

The MGW interfaces the remote MONA compliant UE via a low-level MONA PM handling function. This function handles the MONA frames, and the H.223 multiplexing. The MGW then sends (24) a MONA preference message to the remote UE containing the MONA offer and the codecs (in case of class 1 or 2) as received from the MGCF.

The MGCF will also prepare the related ACP message and send it (45) to the MGW (note: ACP is present in all classes). The MGW will buffer this ACP message until the PM message from the UE has been received. The advantage of this method is that the MGW has already all information available when an ACP protocol decision/fallback is taken. This speeds up the video call setup time.

Additionally, the MGCF will also prepare the initial legacy H.245 messages (46) and send them to the MGW. The MGW will buffer these messages until the MONA capability from the UE is known. The advantage of this method is that the MGW has already all information available when a fallback decision is taken. This speeds up the video call setup time.

According to specification H.324 (Annex K), a fallback from MONA to legacy H.245 signaling may have to be performed, and we will now consider this case.

Figure 17:
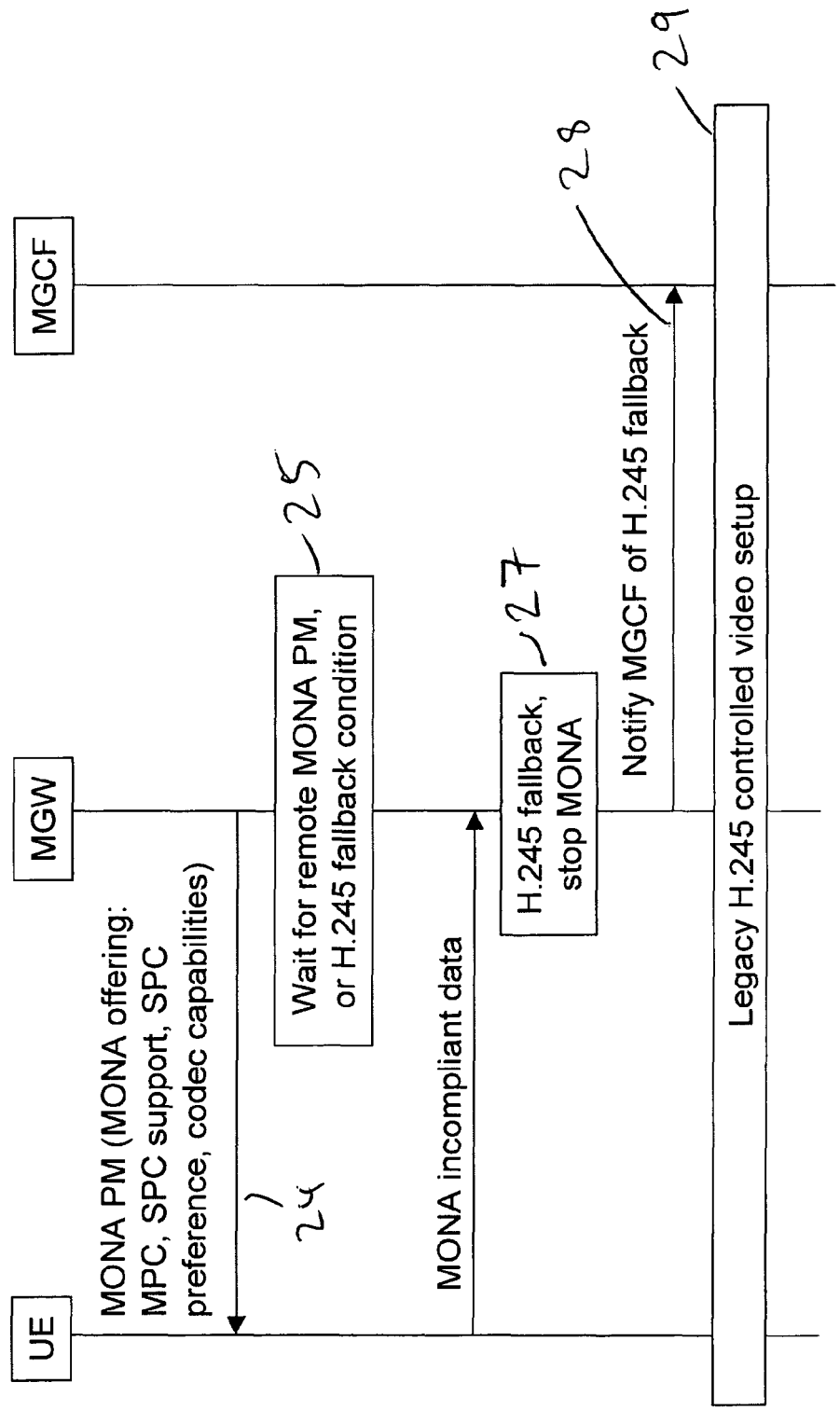
FIG. 17 illustrates steps performed during a fallback to legacy H.245 Procedures according to the third embodiment.

Referring to FIG. 17, after sending the MONA offer in the preference message (24), the MGW waits (25) for signals from the UE. If the low-level MONA handling function in MGW detects the specified legacy H.245 fallback conditions (27), MONA handling is to be terminated and the MGW informs the MGCF about the fallback to legacy H.245 condition (28). The MGCF may also detect the H.245 fallback condition by itself, for example if it receives a H.245 TCS message prior to the notification by the MGW (this is not shown in FIG. 17). In either of these cases the MGCF then initiates normal video setup using legacy H.245 (29).

Figure 18:
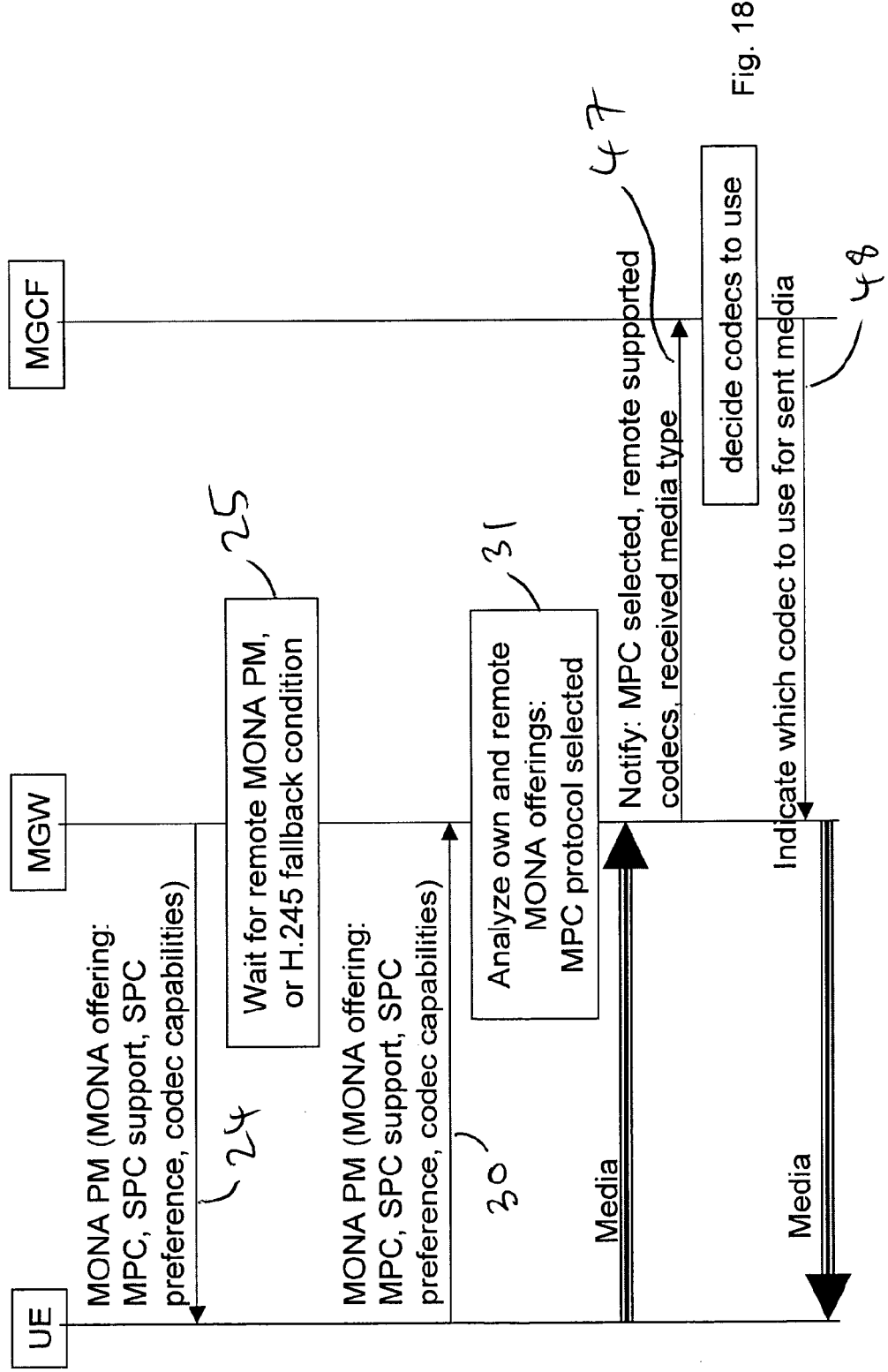
FIG. 18 illustrates steps performed during selection of MPC Protocol according to the third embodiment.

Referring to FIG. 18, we will now consider the case that MPC Protocol is to be selected. After sending the MONA offer in the preference message (24), the MGW waits (25) for signals from the UE. In this case a MONA preference message is received from the UE (30). This message contains the MONA offer of the UE, containing preferences as to which MONA protocol to use. If MPC protocol is selected then a list of codecs supported by the UE are included. The reply from the UE is analyzed by the MGW and here the MPC protocol is selected (31). This result is notified to the MGCF together with the codec information (47).

It is allowed in the specifications to send early media on the supported channels. So if media is received together with, or shortly after, the preference message, the codec type of that media is also notified (47) to the MGCF in order to support any codec decisions in the MGCF.

The MGCF then instructs/indicates to the MGW which codec to use per audio and video media in the transmit direction (48).

Figure 19:
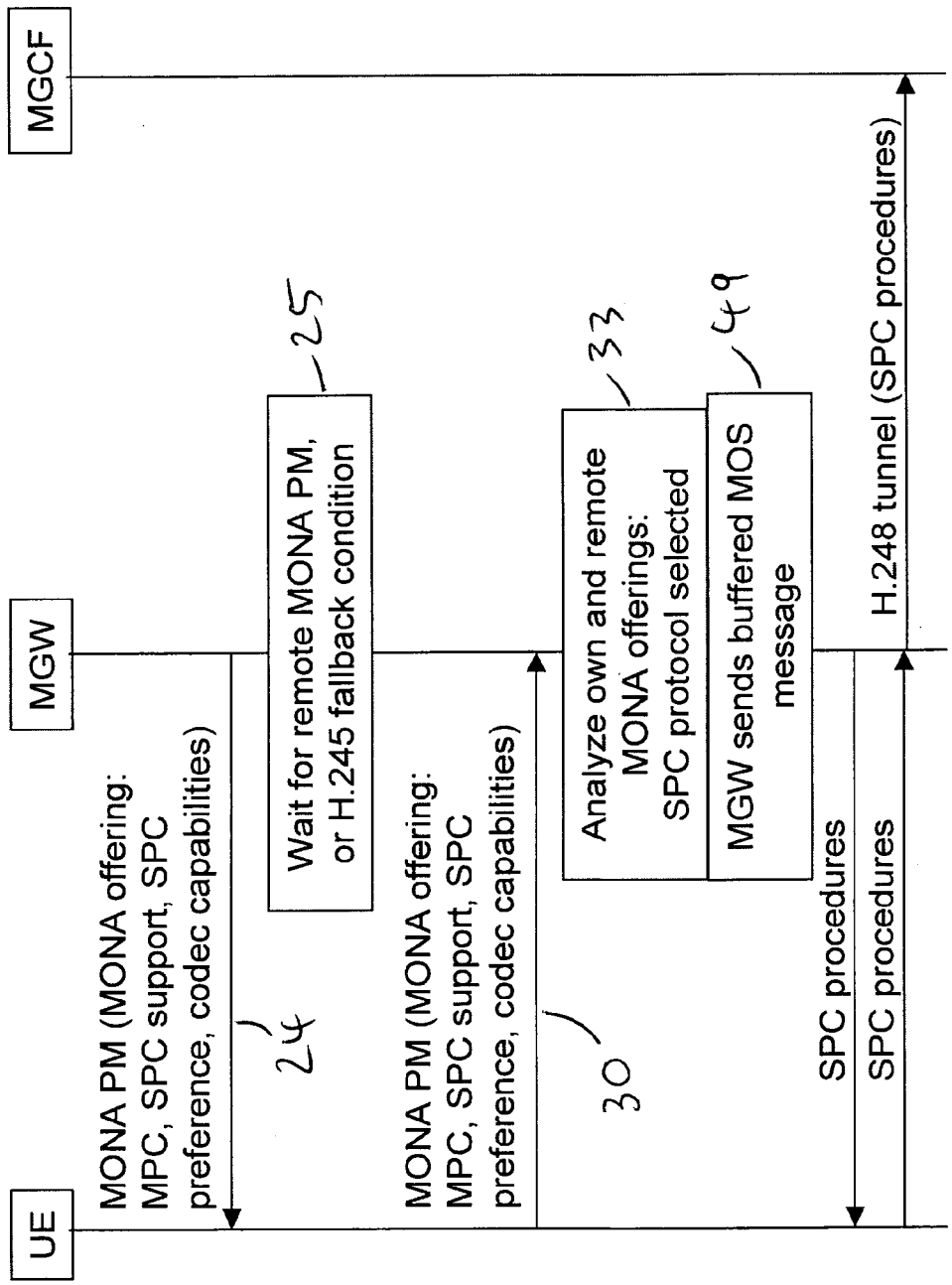
FIG. 19 illustrates steps performed during selection of SPC Protocol according to the third embodiment.

Referring to FIG. 19, we will now consider the case that SPC Protocol is to be selected. After sending the MONA offer in the preference message (24), the MGW waits (25) for signals from the UE. In this case a MONA preference message is received from the UE (30). This message contains the MONA offer of the UE, containing preferences on which MONA protocol to use and which codecs are supported by the UE.

According to specification H.324 (Annex K), under certain conditions SPC is to be selected. When the MGW has analyzed the received UE message and has selected the SPC protocol (33) it can then send the previously buffered SPC MOS message to the UE (49). Any received SPC message is forwarded to the MGCF. The MGCF uses this SPC message as indication that SPC has been selected. The MGCF then continues the SPC procedures towards the remote 3G-324M endpoint for video setup.

Figure 20:
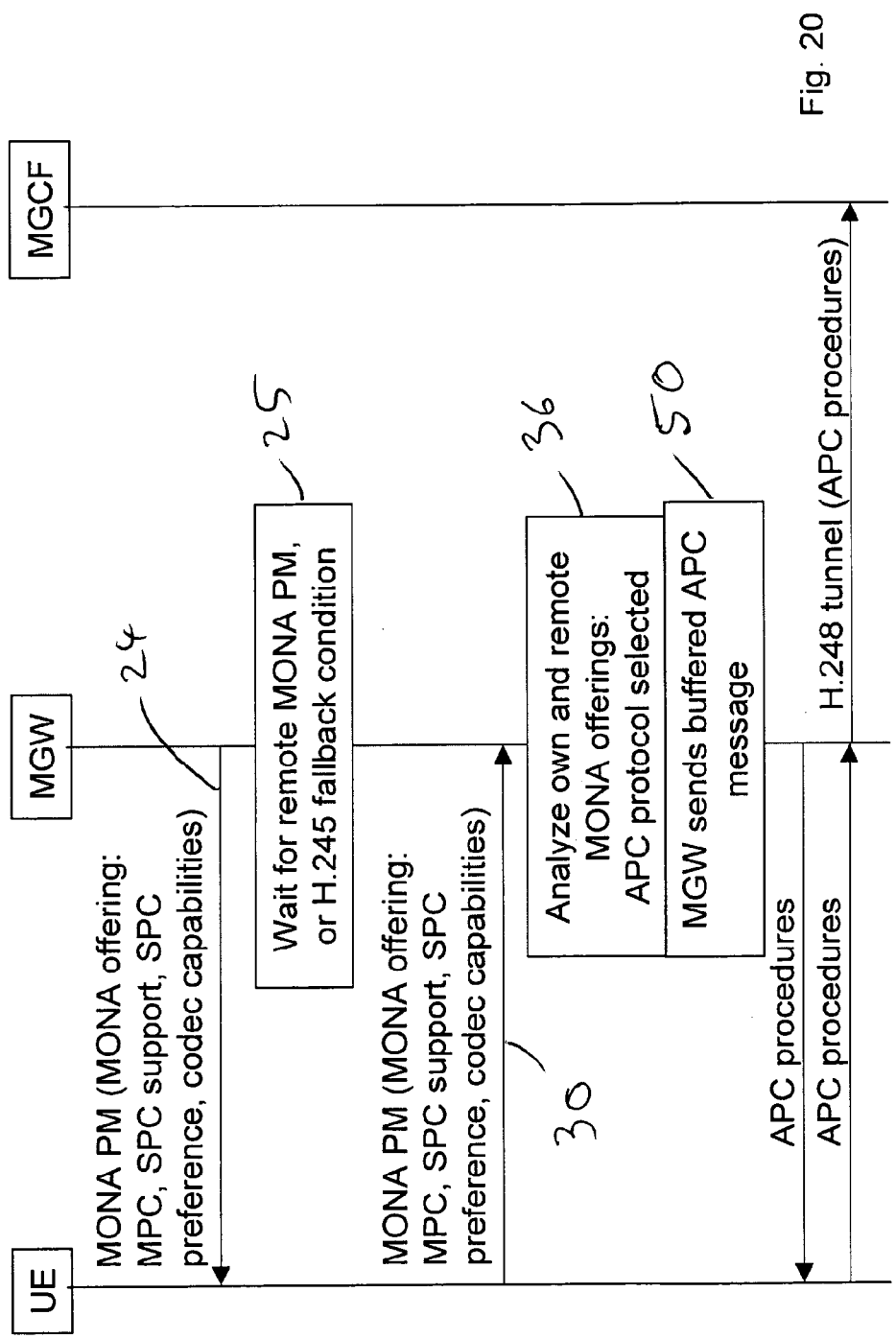
FIG. 20 illustrates steps performed during selection of ACP Protocol according to the third embodiment.

Referring to FIG. 20, we will now consider the case that ACP Protocol is to be selected. After sending the MONA offer in the preference message (24), the MGW waits (25) for signals from the UE. In this case a MONA preference message is received from the remote UE (30). This message contains the MONA offer of the UE, containing preferences as to which MONA protocol to use and which codecs are supported by the UE.

According to specification H.324 (Annex K), under certain conditions ACP is to be selected. When the MGW has analyzed the received UE reply and has selected the ACP protocol (36) it can then send the previously buffered ACP message to the UE (50). Any received ACP message is forwarded to the MGCF. The MGCF uses this ACP message as indication that ACP has been selected. The MGCF then continues the ACP procedures towards the UE for video setup.

Figure 21:
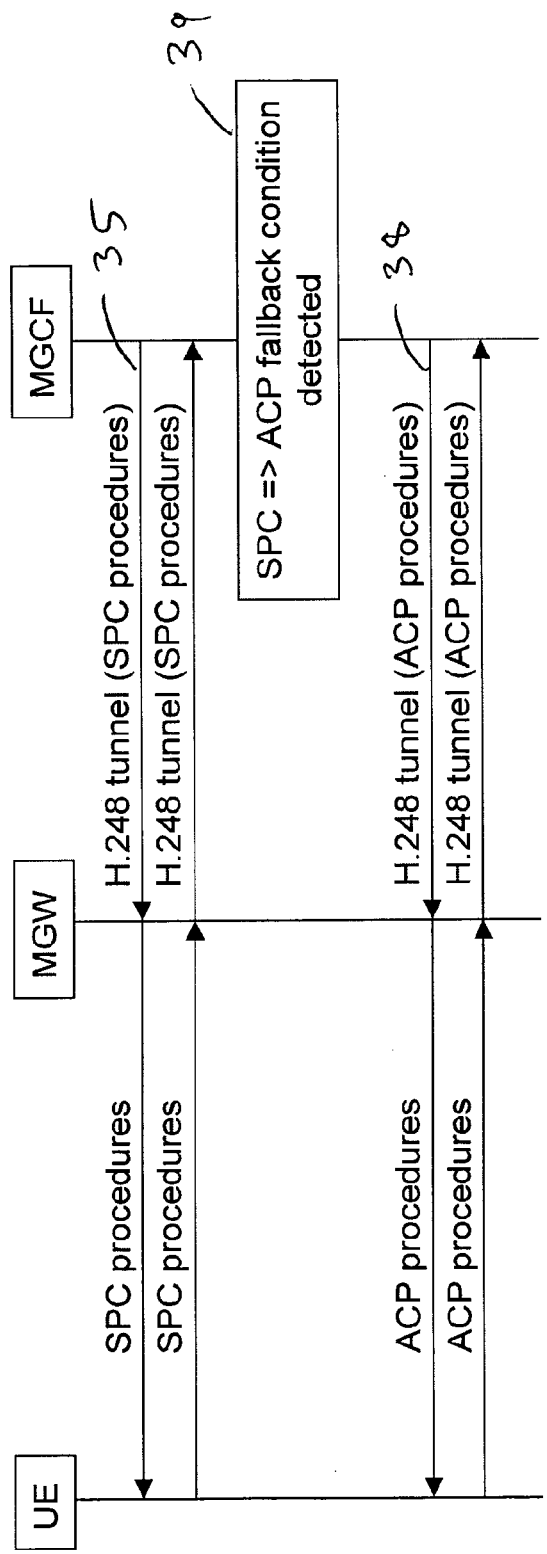
FIG. 21 illustrates steps performed during a fallback from SPC to ACP according to the third embodiment.

As illustrated in FIG. 21, fallback from SPC (35) to ACP (38) may occur after the MONA protocol negotiation has decided to use SPC protocol. According to specification H.324 (Annex K), ACP fallback (39) is to be triggered under certain conditions.

Since SPC and ACP are both located in the MGCF, this fallback is handled internally in the MGCF. It should however be noted that the fallback decision from SPC to ACP can also be performed by the MGW. This would for example be the case if the MGCF offers only SPC support (class III) and the remote UE only supports MPC (class II). This condition can be detected immediately by the MGW when receiving the PM message from the UE.

The parallel procedures of the fourth embodiment will now be described in more detail.

The proposed parallel procedures are intended to speed up video call setup and codec negotiation in fallback cases where first a MONA setup procedure was attempted. The idea is that MGCF provides to MGW not only the information needed to start the wanted MONA procedure but also (in parallel) the messages that would be sent by MGW in case MGCF/MGW had to fallback to another MONA procedure or to legacy H.245 signalling. The MGW then has the responsibility to detect possible fallback conditions and can react immediately by starting the appropriate fallback procedure. The following fallback cases are covered:

from MPC to ACP,
from SPC to ACP,
from MPC to H.245, and
from SPC to H.245.

It is worth noting that no additional parallel procedures are needed for a fallback from MPC to SPC, since the MONA standard anyway requires that MOS request messages are included in the MONA preference message if the MGCF and MGW support the SPC procedure.

A fallback from MPC to ACP may happen if both 3G-324M endpoints (MGCF/MGW and remote endpoint) support MONA class 1 or 2 and SPC is not preferred by any of them. In that case the fallback to ACP would happen if at least for one channel no compatible MPC can be established between the two endpoints.

A fallback from SPC to ACP may happen if MGCF supports only SPC (MONA class 3) and at the same time the remote endpoint only supports MPC (MONA class 2). According to MONA standard the support of ACP is mandatory for all MONA implementations (MONA class 1, 2 and 3).

In order to minimize the fallback time in this situation, it is proposed that the MGCF provides together with the MPC/SPC negotiation information also the first ACP message (containing TCS and MSD messages) and a buffer indicator that this ACP message is to be buffered for a fallback case. The MGW shall buffer this ACP message and only send it to the remote endpoint if the MGW detects that:

no compatible MPC can be established for at least one channel and fallback to SPC is not possible according to MONA standard, and channels cannot be established with SPC since at least one of the endpoints does not support SPC.

Figure 24:
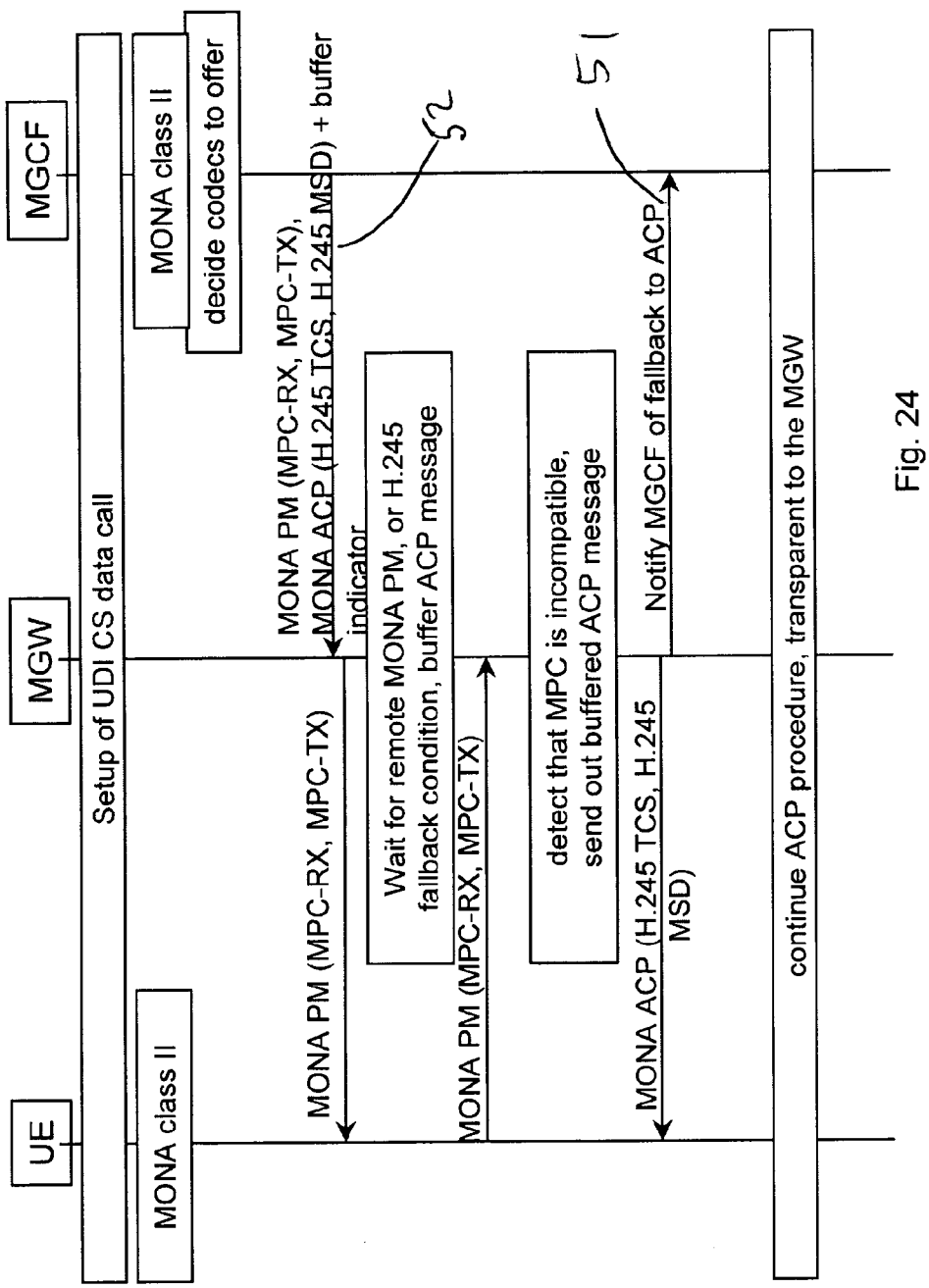
FIG. 24 shows an example message flow for the fallback from MPC to ACP improved by early provisioning of ACP message to the MGW, according to a fourth embodiment.

Referring to FIG. 24, the MGW shall notify the MGCF about the fallback to ACP (51). The additional buffer indicator to buffer the ACP message (52) is proposed since according to the general proposed MONA architecture, the MGW would transparently send out all ACP messages received from the MGCF to the remote endpoint. This buffer indicator shall also contain the information that the buffered message can be deleted in the MGW as soon as MGW detects that either:

All requested channels are established with MPC, or

SPC is used to establish channels, or

Fallback to H.245 protocol is detected.

According to specifications, a fallback from MONA MPC or SPC to legacy H.245 signaling is to be performed upon reception of either: more than 20 legacy stuffing flags; or a normal H.245 TCS message.

In order to minimize the fallback time in a fallback situation, the fourth embodiment proposes that the MGCF provides together with the MPC/SPC negotiation information also a H.245 TCS message (52). This TCS message (in contrary to the TCS message that would be part of an ACP message) shall not contain the MONA capability identifier in the "genericInformation.messageIdentifier", since this TCS message is only to be used for H.245 signaling, without MONA support. It is further proposed that the MGCF includes together with this H.245 TCS message a buffer indicator (52) to the MGW indicating that this H.245 message shall not be sent out directly, but shall be buffered for the case that a fallback to H.245 protocol is needed.

Upon reception of such a buffer indicator together with the H.245 message it is proposed that the MGW shall buffer this H.245 TCS message and only send it to the remote endpoint if the MGW detects a fallback to H.245 protocol, based on the above mentioned conditions (otherwise the message will be discarded in MGW).

The buffer indicator to buffer the H.245 message is proposed since according to the general proposed MONA architecture, the MGW would transparently send out all H.245 messages received from the MGCF to the remote endpoint. This buffer indicator shall also contain the information that the buffered message can be deleted in the MGW as soon as MGW detects that either MPC or SPC or ACP procedures are used to establish the channels.

In case of a fallback to H.245 protocol, the MGW shall also inform the MGCF of the fallback to H.245 procedures.

According to a further refinement the fallback from MPC or from SPC to ACP and H.245 is facilitated. Accordingly, if MGCF/MGW supports MONA procedures (class 1, 2 or 3), then it is proposed that both possible fallback cases are optimized. It is proposed that MGCF sends together with the MONA Preference message the following messages to MGW:

MONA ACP message (TCS+MSD)+additional buffer indicator to buffer this message for possible fallback to ACP; and H.245 TCS (containing no MONA support)+additional buffer indicator to buffer this message for possible fallback to H.245.

MGW shall buffer these messages and use them for the respective fallback cases as indicated above. For each buffered message the respective received buffer indicator shall indicate also the conditions when the message shall be deleted in MGW.

As can be seen, at least preferred embodiments of the invention accelerate the video setup in case of different capabilities with respect to MONA procedures or different preferred codecs in both 3G-324M endpoints (the MGCF/MGW and the remote endpoint). This is achieved by saving the time of one message pair exchange between MGCF and MGW for the case of fallback from MONA MPC/SPC procedure to MONA ACP or to H.245 signalling.

ABBREVIATIONS

ACP Accelerated Call Procedure
AMR Adaptive multi-rate
BICC Bearer Independent Call Control
CS Circuit Switched
DSL Digital Subscriber Line
3GPP Third Generation Partnership Project
IMS IP Multimedia Subsystem
IP Internet Protocol
ISUP Integrated Services Digital Network User Part
ITU International Telecommunication Union
MGCF Media Gateway Control Function
MGw Media Gateway
M-MGw Mobile Media Gateway
MONA Media Oriented Negotiation Acceleration
MOS Media Oriented Setup
MPC Media Preconfigured Channel
MPEG Motion Picture Expert Group
MSC-S Mobile Switching Centre-Server
NNI Network to Network Interface
OID Object Identifier
PM Preference Message
RAN Radio Access Network
RTSP Real Time Streaming Protocol
RX Receive
SDP Session Description Protocol
SIP Session Initiation Protocol
SPC Signaling Preconfigured Channel
TCS TerminalCapabilitySet
TS Technical Specification
TX Transmit
UDI Unrestricted Digital Information
UE User Equipment
V-MGCF Video Media Gateway Control Function
VoIP Voice over Internet Protocol
WLAN Wireless Local Area Network Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An apparatus for enabling interworking of Circuit Switched (CS) video calls with video calls using IP multimedia protocols within a communication network, comprising:
a media gateway (MGW);
a media gateway control function (MGCF): wherein said apparatus is arranged to use Media Oriented Negotiation Acceleration (MONA) functionality to accelerate a set-up of video calls, wherein said MONA functionality further comprises at least one of the following MONA protocols:
Media Preconfigured Channel (MPG) protocol,
Accelerated Call Procedure (ACP) protocol, and
Signaling Preconfigured Channel (SPC) protocol;

wherein at least one of said three MONA protocols is handled in said MGCF and a remainder in said MGW and wherein at least two MONA protocols are available for enabling interworking of a CS video call with a video call using said IP multimedia protocol, a first one of said MONA protocols being preferred over a second one, or a third one of said MONA protocols, and wherein said MGCF is arranged to determine which MONA protocol or protocols to use for a particular call;

wherein said apparatus is arranged to decide under certain conditions to perform a fallback from said first protocol to said second or, where provided, said third protocol; and wherein said first, second, and third protocols are different MONA protocols.

2. The apparatus according to claim 1, wherein a portion of said MONA functionality included in said MGCF comprises an ACP protocol.

3. The apparatus according to claim 1, wherein a portion of said MONA functionality included in said MGCF comprises an ACP protocol and a SPC protocol.

4. The apparatus according to claim 1, wherein said MGW is arranged to detect whether said conditions for performing said fallback have been met.

5. The apparatus according to claim 4, wherein said MGW is arranged to report to said MGCF that said conditions have been met and/or that said fallback is required to be performed.

6. The apparatus according to claim 1, wherein said apparatus is arranged to transmit, before a decision has been taken to perform said fallback, information needed to set up said video call using said second protocol or, where provided, said third protocol.

7. The apparatus according to claim 6, wherein said information comprises an ACP message or a H.245 TCS message, or both.

8. The apparatus according to claim 6, wherein said apparatus is arranged to transmit said information needed to set up said video call using said second or, where provided, said third protocol in a same message as information needed to set up said video call using said first protocol.

9. A method of interworking Circuit Switched (CS) video calls with video calls using IP multimedia protocols within a communication network, said communication network including a media gateway (MGW) and a media gateway control function (MGCF), comprising the steps of:

providing a Media Oriented Negotiation Acceleration (MONA) functionality for accelerating a set up of video calls, wherein said MONA functionality further comprises at least one of the following MONA protocols:

Media Preconfigured Channel (MPC) protocol,
Accelerated Call Procedure (ACP) protocol, and
Signaling Preconfigured Channel (SPC) protocol;

wherein at least one of said three MONA protocols is handled in said MGCF and a remainder in said MGW and wherein at least two MONA protocols are available for enabling interworking of a CS video call with a video call using said IP multimedia protocol;

preferring a first one of said MONA protocols over a second one, or a third one of said MONA protocols for setting up said video call, wherein said MGCF determines which MONA protocol or protocols to use for a particular call;

wherein said method comprises deciding, under certain conditions, to perform a fallback from said first protocol to said second or, when provided, said third protocol; and wherein said first, second, and third protocols are different MONA protocols.

10. The method according to claim 9, wherein said MGW decides whether said fallback should be performed.

11. The method according to claim 10, wherein said MGW reports to said MGCF as to whether said fallback should be performed.

12. The method according to claim 9, further comprising transmitting, before a decision has been taken to perform said fallback, information needed to set up said video call using said second protocol or, where provided, said third protocol.

13. The method according to claim 12, wherein said information comprises an ACP message or a H.245 TCS message, or both.

14. The method according to claim 12, further comprising the step of transmitting, before a decision has been taken to perform said fallback, an indication that said information should be buffered.

15. The method according to claim 14, wherein said indication indicates that said information should be buffered at least until a decision has been taken as to whether or not to perform said fallback.

16. The method according to claim 12, wherein said information needed to set up said video call using said second protocol or, where provided, said third protocol is transmitted in a same message as information needed to set up said video call using said first protocol.

17. The method according to claim 9, wherein said video calls using said IP multimedia protocols comprise video calls in a IP Multimedia Subsystem (IMS).

18. An apparatus for enabling interworking of Circuit Switched (CS) video calls with video calls using IP multimedia protocols within a communication network, comprising:

a media gateway (MGW);
a media gateway control function (MGCF); wherein said apparatus is arranged to use Media Oriented Negotiation Acceleration (MONA) functionality to accelerate a set-up of video calls, wherein said MONA functionality further comprises at least one of the following MONA protocols:

Media Preconfigured Channel (MPC) protocol,
Accelerated Call Procedure (ACP) protocol, and
Signaling Preconfigured Channel (SPC) protocol;

wherein at least one of said three MONA protocols is handled in said MGCF and a remainder in said MGW and wherein at least two MONA protocols are available for enabling interworking of a CS video call with a video call using said IP multimedia protocol, a first one of said MONA protocols being preferred over a second one, or a third one of said MONA protocols;

wherein said apparatus is arranged to decide, under certain conditions, to perform a fallback from said first protocol to said second or, where provided, said third protocol and said MGW is arranged to detect whether said conditions for performing said fallback have been met; and wherein said first second and third protocols are different MONA protocols.

19. The apparatus according to claim 18, wherein said MGCF is arranged to decide which MONA protocol or protocols to use for a particular call.

20. The apparatus according to claim 18, wherein said MGW is arranged to report to said MGCF that said conditions have been met and/or that said fallback is required to be performed.

21. The apparatus according to claim 18, wherein said apparatus is arranged to transmit, before a decision has been taken to perform said fallback, information needed to set up said video call using said second protocol or, where provided, said third protocol.

22. A method of interworking Circuit Switched (CS) video calls with video calls using IP multimedia protocols within a communication network, said communication network including a media gateway (MGW) and a media gateway control function (MGCF), comprising the steps of:
- providing a Media Oriented Negotiation Acceleration (MONA) functionality for accelerating a set up of video calls, wherein said MONA functionality further comprises at least one of the following MONA protocols:
- Media Preconfigured Channel (MPC) protocol,
- Accelerated Call Procedure (ACP) protocol, and
- Signaling Preconfigured Channel (SPC) protocol;
- wherein at least one of said three MONA protocols is handled in said MGCF and a remainder in said MGW and wherein at least two MONA protocols are available for enabling interworking of a CS video call with a video call using said IP multimedia protocol;
- preferring a first one of said MONA protocols over a second one, or a third one of said MONA protocols for setting up said video call;
- deciding, under certain conditions, to perform a fallback from said first protocol to said second or, where provided, said third protocol with said MGW; and
- wherein said first, second, and third protocols are different MONA protocols.

23. The method according to claim 22, wherein said MGCF decides which MONA protocol or protocols to use for a particular call.

24. The method according to claim 22, wherein said MGW reports to said MGCF as to whether said fallback should be performed.

25. The method according to claim 22, further comprising transmitting, before a decision has been taken to perform said fallback, information needed to set up said video call using said second protocol or, where provided, said third protocol.

* * * * *

UNITED STATES PATENT AND TRADEMARK OFFICE
CERTIFICATE OF CORRECTION

| | |
|---|---|
| PATENT NO. | : 8,457,116 B2 |
| APPLICATION NO. | : 12/594382 |
| DATED | : June 4, 2013 |
| INVENTOR(S) | : Ranke et al. |

Page 1 of 1

It is certified that error appears in the above-identified patent and that said Letters Patent is hereby corrected as shown below:

In the Claims

In Column 13, Lines 11-12, in Claim 1, delete "decided under certain conditions" and insert -- decide, under certain conditions, --, therefor.

In Column 14, Line 57, in Claim 18, delete "first second" and insert -- first, second, --, therefor.

Signed and Sealed this
Fourteenth Day of January, 2014

Michelle K. Lee
*Deputy Director of the United States Patent and Trademark Office*